US010299110B2

(12) United States Patent
Ko et al.

(10) Patent No.: US 10,299,110 B2
(45) Date of Patent: May 21, 2019

(54) INFORMATION TRANSMISSION METHOD AND SYSTEM, DEVICE, AND COMPUTER READABLE RECORDING MEDIUM THEREOF

(71) Applicant: SAMSUNG ELECTRONICS CO., LTD., Suwon-si (KR)

(72) Inventors: Jae-woo Ko, Uiwang-si (KR); Tae-hwan Wi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 204 days.

(21) Appl. No.: 13/974,821

(22) Filed: Aug. 23, 2013

(65) Prior Publication Data

US 2014/0059169 A1  Feb. 27, 2014

(30) Foreign Application Priority Data

Aug. 23, 2012 (KR) .................. 10-2012-0092539

(51) Int. Cl.
*G06F 15/16* (2006.01)
*H04W 8/24* (2009.01)
(Continued)

(52) U.S. Cl.
CPC .......... *H04W 8/24* (2013.01); *G06F 3/03545* (2013.01); *G06F 3/0484* (2013.01);
(Continued)

(58) Field of Classification Search
CPC ............ H04L 41/0893; H04L 67/125; H04L 12/2803; H04L 41/00; H04W 8/24;
(Continued)

(56) References Cited

U.S. PATENT DOCUMENTS 6,070,195 A * 5/2000 Yamamoto ............... G09G 5/00
709/217
6,563,494 B1   5/2003 Eichstaedt et al.
(Continued)

FOREIGN PATENT DOCUMENTS

EP      1583293 A2    10/2005
JP      2010-81300 A   4/2010
(Continued)

OTHER PUBLICATIONS

International Search Report (PCT/ISA/210), dated Dec. 24, 2013, issued by the International Searching Authority in counterpart International Patent Application No. PCT/KR2013/007560.
(Continued)

*Primary Examiner* — Aftab N. Khan
*Assistant Examiner* — Anh Nguyen
(74) *Attorney, Agent, or Firm* — Sughrue Mion, PLLC

(57) ABSTRACT

An information transmission method performed by a device is provided. The method includes receiving a selection, performed by an external input device, of target information displayed on the device, extracting the target information corresponding to the selection of the external input device, and transmitting information corresponding to the target information to the external input device.

22 Claims, 28 Drawing Sheets

(51) Int. Cl.
*G06F 3/0484* (2013.01)
*G06F 3/0488* (2013.01)
*G06T 11/00* (2006.01)
*G06F 3/0487* (2013.01)
*G06F 3/0354* (2013.01)
*H04W 4/80* (2018.01)

(52) U.S. Cl.
CPC ........ *G06F 3/0487* (2013.01); *G06F 3/04842* (2013.01); *G06F 3/04845* (2013.01); *G06F 3/04883* (2013.01); *G06T 11/00* (2013.01); *G06F 2203/0384* (2013.01); *H04W 4/80* (2018.02)

(58) Field of Classification Search
CPC .. H04W 4/008; G06F 3/03545; G06F 3/0487; G06F 3/04845; G06F 3/0484; G06F 3/04883; G06F 3/04842; G06F 2203/0384; G06T 11/00; H04R 9/16; H04R 11/12; H04R 17/08; H04R 19/10; G03G 15/325; G03G 15/348
See application file for complete search history.

(56) References Cited

U.S. PATENT DOCUMENTS

| | | | |
|---|---|---|---|
| 6,898,627 B1* | 5/2005 | Sekiguchi | H04L 51/066 370/386 |
| 6,933,919 B1 | 8/2005 | Anderson et al. | |
| 6,967,675 B1* | 11/2005 | Ito | H04N 5/23293 348/207.1 |
| 8,171,419 B2 | 5/2012 | Mujkic et al. | |
| 2005/0220060 A1* | 10/2005 | Takusagawa | G06F 17/30876 370/338 |
| 2006/0192772 A1 | 8/2006 | Kambayashi | |
| 2006/0227121 A1 | 10/2006 | Oliver | |
| 2007/0300258 A1* | 12/2007 | O'Connor | A23L 2/52 725/44 |
| 2008/0109820 A1 | 5/2008 | Raghunandan | |
| 2009/0167781 A1* | 7/2009 | Nakata | G09G 5/39 345/596 |
| 2010/0030921 A1* | 2/2010 | Kim | 710/10 |
| 2010/0090971 A1* | 4/2010 | Choi | G06F 3/04883 345/173 |
| 2011/0141067 A1 | 6/2011 | Misawa et al. | |
| 2011/0154123 A1* | 6/2011 | Barrall | G06F 11/0727 714/42 |
| 2012/0044168 A1 | 2/2012 | Lu et al. | |
| 2012/0047331 A1* | 2/2012 | Meza et al. | 711/134 |
| 2012/0147751 A1* | 6/2012 | Ulm | H04L 12/2801 370/237 |
| 2012/0208466 A1* | 8/2012 | Park et al. | 455/41.3 |
| 2013/0091238 A1* | 4/2013 | Liu et al. | 709/217 |
| 2013/0110974 A1* | 5/2013 | Arrasvuori et al. | 709/217 |
| 2013/0136363 A1 | 5/2013 | Na | |
| 2014/0122818 A1* | 5/2014 | Hayasaka et al. | 711/162 |

FOREIGN PATENT DOCUMENTS

| | | |
|---|---|---|
| KR | 10-2012-0014480 A | 2/2012 |
| RU | 2198428 C2 | 2/2003 |
| WO | 98/20446 A1 | 5/1998 |
| WO | 2006/123328 A1 | 11/2006 |

OTHER PUBLICATIONS

Communication dated Apr. 6, 2016, issued by the European Patent Office in counterpart European Patent Application No. 13181486.5.
Communication dated Jan. 12, 2017 issued by European Patent Office in counterpart European Application No. 13 181 486.5.
Richard Tubb, "How to Send Large Attachments via Email", Nov. 11, 2007, 4 pages total, URL:http://www.tubblog.co.uk/2007/11/11/sending-large-attachements-via-email/, XP055331065.
Communication dated Jul. 4, 2017, issued by the European Patent Office in counterpart European Application No. 13181486.5.
Communication dated Aug. 1, 2017, issued by the Russian Patent Office in counterpart Russian Application No. 2015105950/08.

* cited by examiner

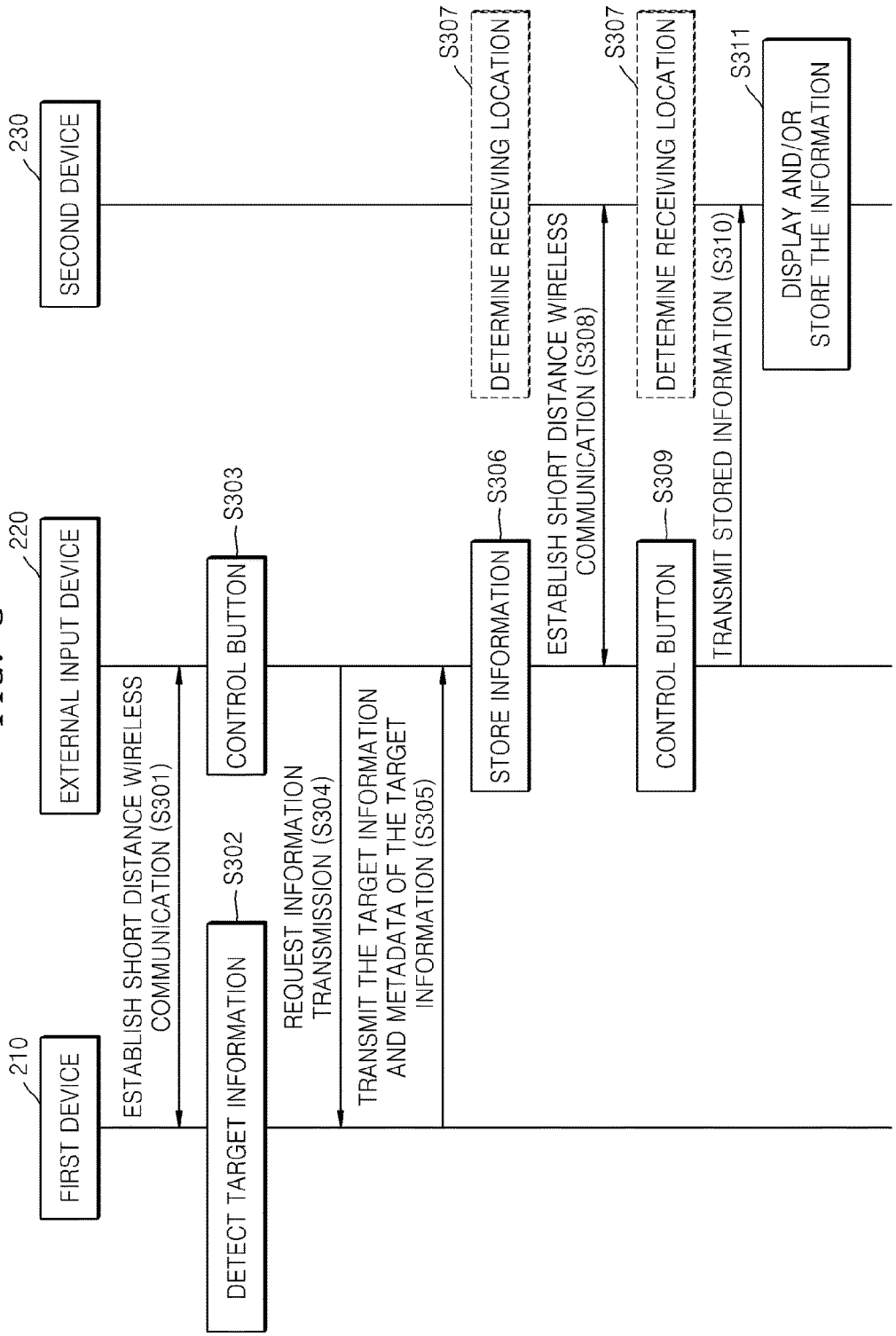

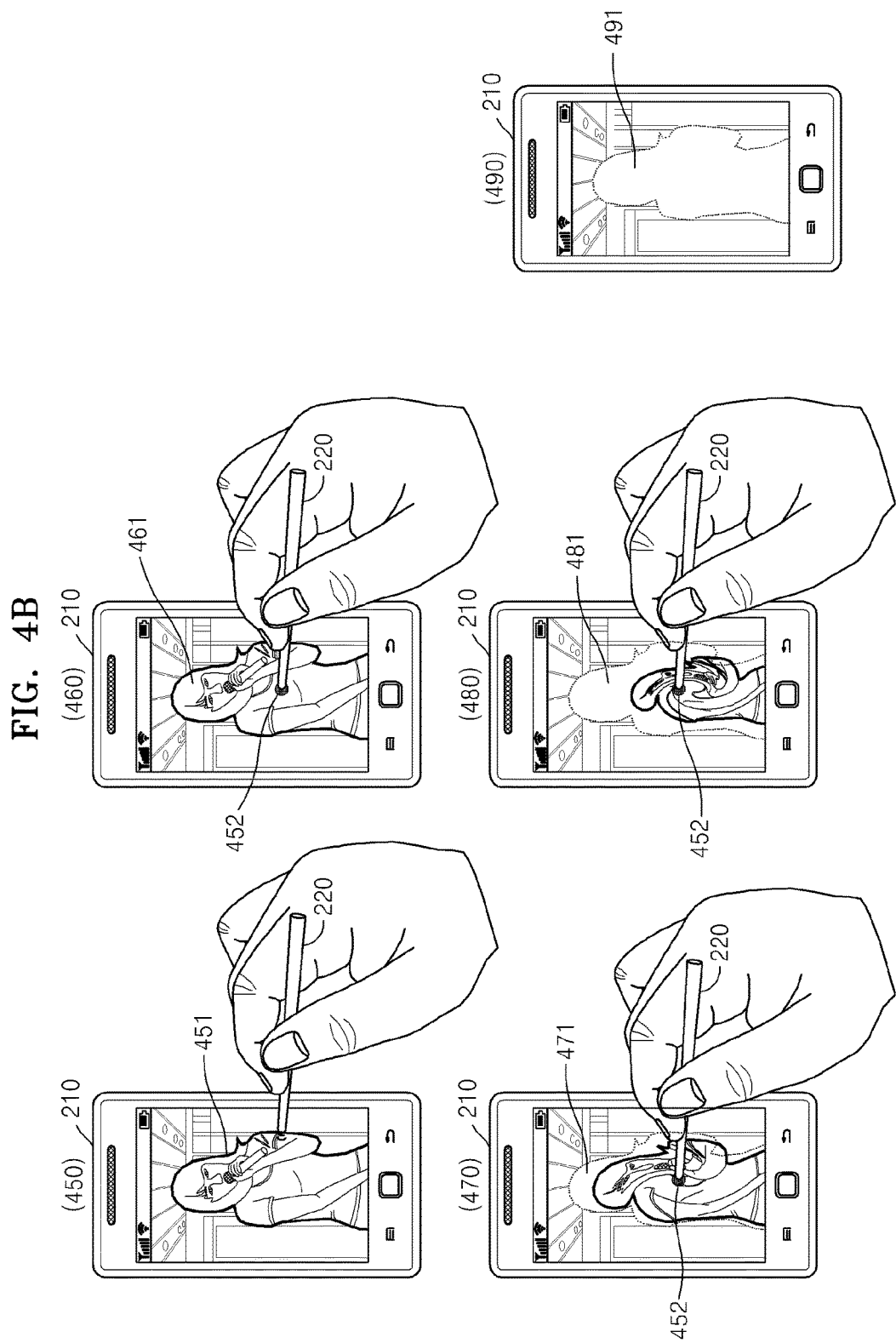

FIG. 5
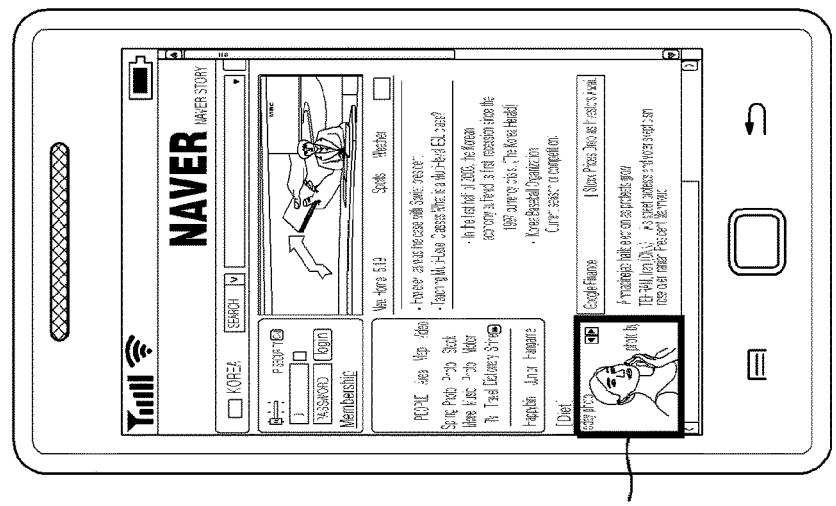
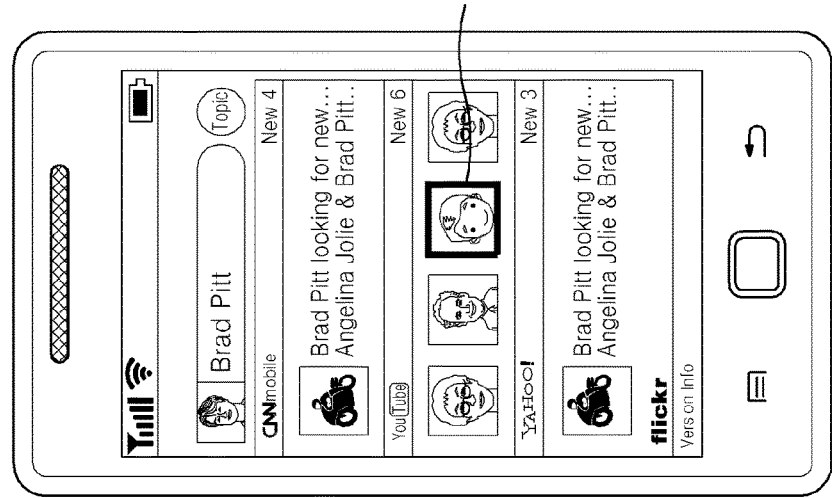
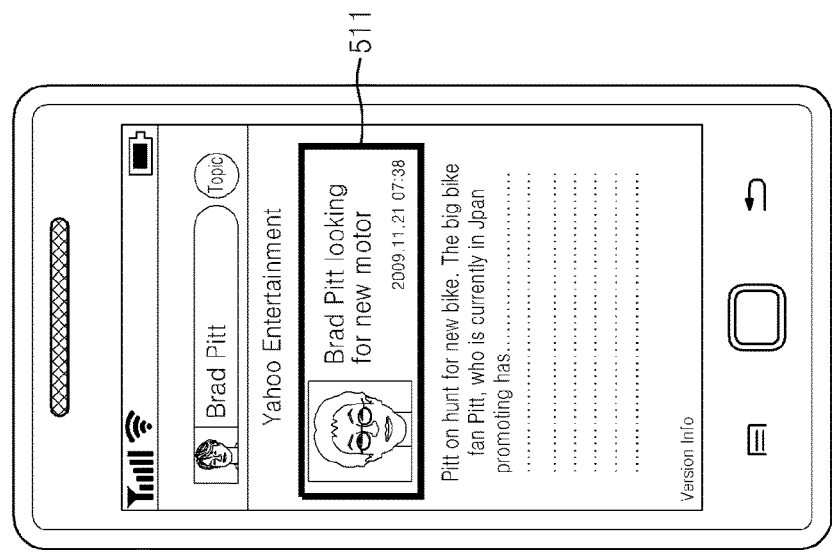

INFORMATION TRANSMISSION METHOD AND SYSTEM, DEVICE, AND COMPUTER READABLE RECORDING MEDIUM THEREOF

CROSS-REFERENCE TO RELATED PATENT APPLICATION

This application claims priority from Korean Patent Application No. 10-2012-0092539 filed on Aug. 23, 2012, in the Korean Intellectual Property Office, the disclosure of which is hereby incorporated herein in its entirety by reference.

BACKGROUND

1. Field

Exemplary embodiments relate to information transmission, and more particularly to, a method and system for wirelessly transmitting information between devices, a device for wirelessly transmitting information, and a computer readable recording medium thereof.

2. Description of the Related Art

With the development of wireless communication technology, various technologies for wirelessly transmitting information have been proposed. An example of such technology is an information transmission service for wirelessly sharing content.

A recently introduced information transmission service for wirelessly sharing content may execute a content share application in each device that is able to share the content and transmit the content between devices. However, content may only be transmitted when a direct communication channel between the devices is active.

SUMMARY

One or more exemplary embodiments provide a method and system for transmitting information by using an input device, a device, and a computer readable recording medium thereof.

One or more exemplary embodiments also provide a method and system for transmitting information by using an external input device without connecting between devices, a device, and a computer readable recording medium thereof.

One or more exemplary embodiments also provide a method and system for transmitting information by using an external input device irrespective of whether an information transmission application is to be executed, a device, and a computer readable recording medium thereof.

One or more exemplary embodiments also provide a method and system for transmitting target information selected by using an external input device, a device, and a computer readable recording medium thereof.

One or more exemplary embodiments also provide a method and system for transmitting information between devices by using an external input device capable of short distance wireless communication, a device, and a computer readable recording medium thereof.

One or more exemplary embodiments also provide a method and system for transmitting and receiving information by using an input device, a device, and a computer readable recording medium thereof.

According to an aspect of an exemplary embodiment, there is provided an information transmission method performed by a device. The method includes receiving a selection, performed by an external input device, of target information displayed on the device; extracting the target information corresponding to the selection of the external input device; and transmitting information corresponding to the target information to the external input device.

The selection may include a selection of at least one display area according to a user input.

The method may further include displaying information corresponding to the selected at least one display area.

The information corresponding to the selected at least one display area may include at least one of highlight information, boundary line information, looped curve information, and drag based block information.

The transmitting the information corresponding to the target information to the external input device may include: detecting a size of the information corresponding to the target information, wherein the transmitting the information includes transmitting the target information and metadata corresponding to the target information if the size of the information corresponding to the target information is less than or equal to a storage capacity of the external input device, and wherein the transmitting the information comprises transmitting only the metadata corresponding to the target information if the size of the information corresponding to the target information is greater than the storage capacity of the external input device.

The method may further include receiving information regarding the storage capacity of the external input device from at least one of the external input device in response to communication being established between the device and the external input device, the external input device along with a first information transmission request signal, the external input device when the information regarding the storage capacity of the external input device is updated.

The metadata corresponding to the detected target information may include information used to execute an application related to the detected target information in at least one external device.

The receiving the selection of target information may include receiving a selection of a plurality of display items or display locations displayed on the device.

The transmitting the information corresponding to the target information may include changing a display status of the target information on the device based on an information transmission speed between the device and the external input device.

The method may further include receiving authentication information from the external input device, wherein the transmitting the information corresponding to the target information comprises determining whether to transmit the information corresponding to the target information based on the authentication information of the external input device.

The authentication information of the external input device may be received from the external input device along with a first information transmission request signal or may be received from the external input device when communication is established between the device and the external input device.

The transmitting the information corresponding to the target information may be performed by using short distance wireless communication.

The method may also include receiving a second selection of second target information displayed on the device from the external input device, wherein the transmitting further comprises transmitting information corresponding to the second target information to the external input device.

The method may also include receiving second information corresponding to target information selected on a second device from the external input device; and displaying, on the device, the second target information.

According to an aspect of another exemplary embodiment, a device is provided. The device includes: a communication interface which is configured to transmit and receive data to and from an external input device; and a controller which is configured to receive a selection of target information displayed on the device from the external input device, extract the target information corresponding to the selection of the external input device, and control the communication interface to transmit information corresponding to the target information to the external input device.

The controller may be further configured to detect a size of the information corresponding to the target information, wherein if the controller detects the size of the target information is less than or equal to a storage capacity of the external input device, the controller controls the communication interface to transmit the information corresponding to the target information including the target information and metadata corresponding to the target information, and wherein if the controller detects the size of the target information is greater than the storage capacity of the external input device, the controller controls the communication interface to transmit the information corresponding to the target information including only the metadata corresponding to the target information.

The metadata corresponding to the detected target information may include information used to execute an application related to the detected target information in at least one external device.

The communication interface may include a short distance wireless communication interface.

The controller may be further configured to receive a second selection of second target information displayed on the device from the external input device, and control the communication interface to transmit information corresponding to the second target information to the external input device.

The device may further include a display, wherein the controller is further configured to control the communication interface to receive second information corresponding to target information selected on a second device from the external input device, and control the display to display the second target information.

According to an aspect of another exemplary embodiment, an information transmission method performed by an input device is provided. The method includes: receiving, from a first device, information corresponding to target information selected from a screen displayed on the first device; storing the received information in the input device; and transmitting the stored information to at least one of the first device and a second device.

The method may further include selecting, by using the input device, the target information from the screen displayed on the first device.

The receiving and/or the transmitting may be performed using short distance wireless communication.

The method may further include displaying status information of a storage space of the input device on the input device.

The method may further include transmitting authentication information of the input device to the first device, wherein the receiving is performed in response to the input device being authenticated by the first device based on the authentication information.

The method may further include displaying information, on the input device, indicating whether the transmitting the stored information is completed.

According to an aspect of another exemplary embodiment, an input device is provided. The input device includes: a storage; a tip which is configured to provide an input into at least one of a first device and a second device; a communication interface which is configured to transmit and receive data to and from the at least one of the first device and the second device; a controller which is configured to control the communication interface to receive information corresponding to target information selected from a screen displayed on the first device, control the storage to store the received information, and control the communication interface to transmit the stored information to at least one of the first device and the second device.

The communication interface may include a short range wireless communication interface.

The input device may further include a display, wherein the controller is further configured to monitor a storage space of the storage and control the display to display status information indicating the storage space, and wherein the controller is further configured to control the display to display information indicating whether the received information is completely stored and display information indicating whether the stored information is completely transmitted.

The storage may further store authentication information of the input device, and the controller may be further configured to transmit the authentication information to the first device when communication is established between the first device and the input device, and transmit the authentication information to the second device when communication is established between the second device and the input device.

According to an aspect of another exemplary embodiment, there is provided an information transmission method performed by a device, the method including: detecting at least one piece of target information from a screen displayed on the device; receiving a first information transmission request signal regarding the detected at least one piece of target information from the outside of the device; and transmitting at least one of the detected at least one piece of target information and metadata of the detected at least one piece of target information to an external input device in response to the received first information transmission request signal.

The detecting the at least one piece of target information may include selecting at least one display area according to user input information based on the screen displayed on the device.

The detecting the at least one piece of target information may further include displaying information indicating a selection status of the selected at least one display area.

The information indicating the selection status of the selected at least one display area may be one or more of at least one of highlight information, boundary line information, looped curve information, and drag based block information.

The transmitting of the at least one of the target information and the metadata of the target information to the external input device may include: detecting an amount of information regarding the selected at least one display area; if the detected amount of information regarding the selected at least one display area is smaller than a storage capacity of the external input device, transmitting the detected at least one piece of target information to the external input device; and if the detected amount of the information regarding the selected at least one display area is not smaller than the storage capacity of the external input device, transmitting the metadata of the detected at least one piece of target information to the external input device.

The transmitting of the at least one of the target information and the metadata of the target information to the external input device may include: detecting an amount of the detected at least one piece of target information; if the detected amount of the detected at least one piece of target information is smaller than a storage capacity of the external input device, transmitting the detected at least one piece of target information to the external input device; and if the detected amount of the detected at least one piece of target information is not smaller than the storage capacity of the external input device, transmitting the metadata of the detected at least one piece of target information to the external input device.

Information regarding the storage capacity of the external input device is received from the external input device when communication is established between the device and the external input device, is received from the external input device along with the first information transmission request signal, or is received from the external input device when the information regarding the storage capacity of the external input device is updated.

The transmitting of the at least one of the target information and the metadata of the target information to the external input device may include: detecting the sum of an amount of the detected at least one piece of target information and an amount of metadata of the detected at least one piece of target information; if the detected sum is smaller than a storage capacity of the external input device, transmitting the detected at least one piece of target information and the metadata of the detected at least one piece of target information to the external input device; and if the detected sum is not smaller than the storage capacity of the external input device, transmitting the metadata of the detected at least one piece of target information to the external input device.

The transmitting of the at least one of the target information and the metadata of the target information to the external input device may include: changing a display status of the detected at least one piece of target information on the device based on an information transmission speed between the device and the external input device to present a transmission status of the at least one of the target information and the metadata of the target information to the external input device.

The transmitting of the at least one of the target information and the metadata of the target information to the external input device may include determining whether to transmit the at least one of the target information and the metadata of the target information to the external input device by using authentication information of the external input device.

The determining of whether to transmit the at least one of the target information and the metadata of the target information to the external input device by using authentication information of the external input device is performed according to security level information determined based on at least one of a time at which the first information transmission request signal is received and a location of the device when the first information transmission request signal is received, wherein the authentication information of the external input device includes the security level information.

The authentication information of the external input device is received from the external input device along with the first information transmission request signal or is received from the external input device when communication is established between the device and the external input device.

The receiving of the first information transmission request signal may include receiving the first information transmission request signal based on at least one of user input information via the external input device and user input information via the device.

The receiving of the first information transmission request signal may include receiving the first information transmission request signal from the external input device when an information transmission request button mounted on the external input device is activated.

The receiving of the first information transmission request signal may include receiving the first information transmission request signal from the external input device through short distance wireless communication when an information transmission request button mounted on the external input device is activated while the external input device touches the detected at least one piece of target information.

The method may further include: receiving a second information transmission request signal regarding the detected at least one piece of target information from at least one external device; and transmitting the detected at least one piece of target information to the at least one external device in response to the second information transmission request signal.

The at least one external device may include an device that receives metadata of the detected at least one piece of target information from the external input device.

The detecting of the at least one piece of target information may include: detecting a plurality of pieces of target information, wherein the transmitting of the at least one of the target information and the metadata of the target information to the external input device includes: continuously transmitting information related to the detected plurality of pieces of target information to the external input device according to a selection order of the plurality of pieces of target information.

The detecting of the at least one piece of target information may include: detecting a plurality of pieces of target information, wherein the received first information transmission request signal is information transmission request signal related to one of the plurality of pieces of detected target information.

The metadata of the detected target information may include information used to execute an application related to the detected target information in at least one external device.

According to an aspect of another exemplary embodiment, there is provided an information transmission method performed by a device, the method including: detecting at least one piece of target information from a screen displayed on the device; receiving an information transmission request signal regarding the detected at least one piece of target information from the outside of the device; and transmitting the detected at least one piece of target information to an external input device in response to the received information transmission request signal.

According to an aspect of another exemplary embodiment, there is provided an information transmission method performed by a device, the method including: detecting at least one piece of target information from a screen displayed on the device; receiving an information transmission request signal regarding the detected at least one piece of target information from an external of the device; and transmitting metadata of the detected at least one piece of target information to an external input device in response to the received information transmission request signal.

According to an aspect of another exemplary embodiment, there is provided a device including: a first communication interface configured to communicate with an external input device; a storage configured to store at least one application, an information transmission program based on communication with the external input device, and information necessary for executing the information transmission program; an input information receiving interface configured to receive user input information; an output interface configures to output user interface information according to the user input information and information according to a result of the executing of the information transmission program; and a processor configured to detect at least one piece of target information from a screen displayed on the output interface, receiving a first information transmission request signal from the outside of the device, and transmitting at least one of the detected at least one piece of target information and metadata of the detected at least one piece of target information to the external input device through the first communication interface in response to the received first information transmission request signal.

According to an aspect of another exemplary embodiment, there is provided an information transmission method performed by an input device, the method including: receiving, from a first device, at least one of at least one piece of target information and metadata of the at least one piece of target information selected from a screen displayed on the first device; storing the received information in the input device; and transmitting the stored information to at least one second device.

According to an aspect of another exemplary embodiment, there is provided an input device including: a storage configured to store at least one piece of received information; a communication interface configured to receive at least one of target information included in at least one display area selected from a first device and metadata of the target information and transmit the at least one piece of information stored in the storage to a second device; a pen configured to input information in the first device and the second device; and a processor configured to control the communication interface and the storage.

According to an aspect of another exemplary embodiment, there is provided an information transmission method performed by a device, the method including: receiving information stored in an external input device from the external input device when communication between the device and the external input device is established; and displaying at least one target information based on the received information, wherein the at least one target information is selected from a screen displayed on another device, wherein the received information includes information related to the selected at least one target information.

According to an aspect of another exemplary embodiment, there is provided a device including: a first communication interface configured to communicate with an external input device; storage configured to store at least one application, at least one program, and information; an input information receiver configured to receive user input information; an output interface configured to output user interface information according to the user input information and information according to the execution of the at least one program; and a processor configured to receive information stored in the external input device from the external input device when communication between the device and the external input device is established through the first communication interface, and display at least one piece of target information based on the received information, wherein the at least one piece of target information is selected from a screen displayed on another device, wherein the received information includes information related to the at least one piece of target information.

According to an aspect of another exemplary embodiment, there is provided an information transmission system including: an input device configured to include a pen; a first device configured to detect at least one piece of target information from a screen displayed on the first device, and transmit at least one of the detected at least one piece of target information and metadata of the detected at least one piece of target information to the input device so that the at least one of the detected at least one piece of target information and metadata of the detected at least one piece of target information is stored in the input device; and a second device configured to receive the information stored in the input device and display the detected at least one target information based on the received information from the input device.

According to an aspect of another exemplary embodiment, there is provided a non-transitory computer readable recording medium storing one or more programs including a command language for executing an information transmission method, wherein the information transmission method is performed in the same manner as the above-described information transmission method.

BRIEF DESCRIPTION OF THE DRAWINGS

The above and other features and advantages will become more apparent by describing in detail exemplary embodiments thereof with reference to the attached drawings in which:

FIG. 3 is a flowchart of an information transmission method, according to an exemplary embodiment;

FIGS. 4A through 4D show screen examples for explaining selection and transmission of target information by a first device, according to an exemplary embodiment;

FIG. 5 shows screen examples for explaining selection of target information by a first device, according to an exemplary embodiment;

DETAILED DESCRIPTION OF THE EXEMPLARY EMBODIMENTS

Figure 1:
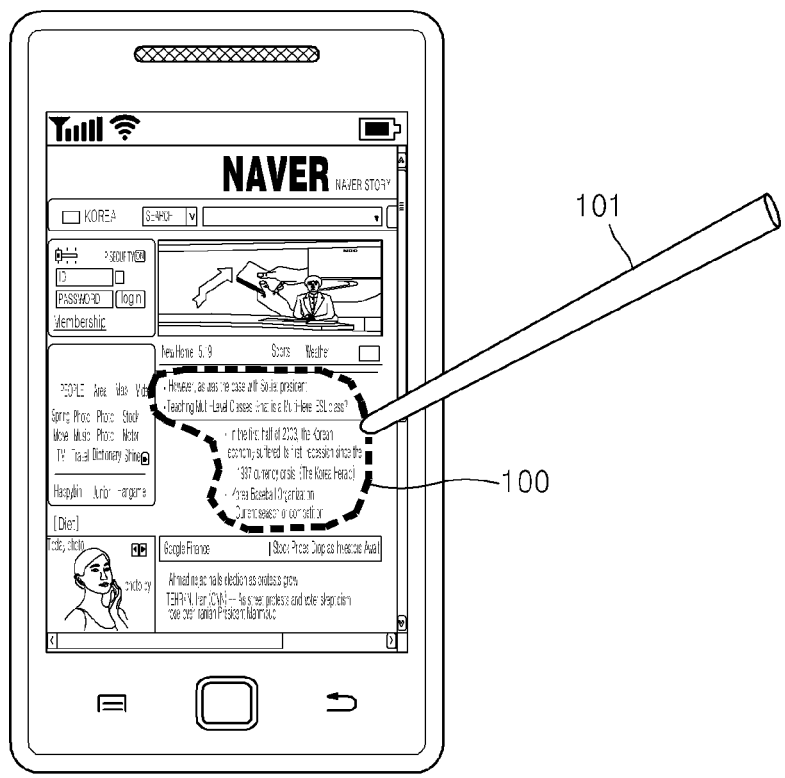
FIG. 1 shows a screen for describing selection of target information, according to an exemplary embodiment.

As the exemplary embodiments allow for various changes and numerous embodiments, particular exemplary embodiments will be illustrated in the drawings and described in detail in the written description. However, this is not intended to limit the exemplary embodiments to particular modes of practice, and it will be appreciated that all changes, equivalents, and substitutes that do not depart from the spirit and technical scope of the exemplary embodiments are encompassed in the exemplary embodiments. In the description of the exemplary embodiments, certain detailed explanations of the related art are omitted when it is deemed that they may unnecessarily obscure the essence of the exemplary embodiments.

Terms such as "first" and "second" are used herein merely to describe a variety of constituent elements, but the constituent elements are not limited by the terms. The terms are used only for the purpose of distinguishing one constituent element from another constituent element.

Most of the terms used herein are general terms that are widely used in the technical art to which the exemplary embodiments pertain. However, some of the terms used herein may be created to reflect intentions of technicians in this art, precedents, or new technologies. Some of the terms used herein may be arbitrarily chosen by the present applicant. In this case, these terms are described in detail below. Accordingly, the specific terms used herein should be understood based on the unique meanings thereof and the whole context of the exemplary embodiments.

As used herein, the singular forms "a", "an" and "the" are intended to include the plural forms as well, unless the context clearly indicates otherwise. It will be further understood that the terms "comprise" and "contain" and variations of the words, for example "comprises" or "comprising," when used in this specification, mean "including but not limited to", and specify the presence of stated features, integers, steps, operations, elements, components, and/or groups thereof, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Throughout this specification, the term 'application' may be used to refer to software performing a specific function. For example, the application may include a camera application, a word processing application, an email application, a scheduling application, a web browsing application, a content reproduction application, and a clipboard management and/or execution application, but is not limited thereto. The application may be referred to as an application program.

Throughout this specification, the term 'target information' may be information transmitted between devices, information selected based on a screen displayed on a device. The target information may be referred to as object information.

The target information may be selected and detected in units of content, file, or folder. The content, file, and folder units may be configured based on moving images, photos, music, electronic documents, email documents, and contacts. Thus, the target information may be selected and detected in units of moving images, photos, music, electronic documents, email documents, and contacts.

The target information may be information included in a display area selected from a screen displayed on a device. For example, as shown in FIG. 1, the target information may be information included in a display area indicated by a dotted line 100 or information excluded from (e.g., outside of) the display area indicated by the dotted line 100. The target information may be determined to be the information included in or excluded from the display area indicated by the dotted line 100 according to an operating condition set in the device.

For example, when the operating condition of the device is set to recognize a display area outside the display area indicated by the dotted line 100 as a selected display area, the target information is information excluded from the dotted line 100. When the operating condition of the device is set to recognize a display area within the dotted line 100 as a selected display area, the target information is information included in the display area indicated by the dotted line 100. The above-described operating condition of the device may be set according to user input information that will be described later.

The display area indicated in the dotted line 100 may be set by drawing using a touch based external input tool 101 as shown in FIG. 1. Thus, the greater the precision of the touch based input tool 101, the more freely and elaborately the target information may be selected. For example, a display area including one character may be selected using the touch based input tool 101. The target information may be randomly selected or delineated by a user. The target information may be referred to as a cropped image or cropped text.

Metadata of the target information includes data necessary for reproducing or displaying the target information. For example, the metadata of the target information may include a uniform resource locator (URL) of the target information, a name thereof, coordinate information thereof on a screen, a data amount thereof, a data amount of the metadata thereof, identification information of a device that is available for communicating with a device that stores the target information, and communication service information (for example, NFC, Bluetooth, etc.) used by the device that stores the target information, but is not limited thereto. The data amount of the target information and the data amount of the metadata thereof may be expressed in size in units of bytes, etc. The URL of the target information may refer to a location on the first device which stores the target information, a location on a server which receives and stores the target information, and a location in an external input device which receives and stores the target information.

The metadata of the target information may further include various types of data according to a type of the target information. For example, when the target information is related to a music file, the metadata of the target information may further include a singers name, genre information, and a music title, etc. When the target information is related to an image file, the metadata of the target information may further include resolution information used to determine an image characteristic, a color space, and a drafters name.

If communication between devices is set, the metadata of the target information may further include information used to automatically execute an application related to the target information. For example, regarding a screen of FIG. 1, if the target information is information included in the display area indicated by the dotted line 100 selected from the screen displayed by executing a web browser (in this example, directed to a webpage presented by the Naver web portal), the information used to automatically execute the application related to the target information may include a URL of a web page and an execution command of the web browser. If the target information is a photo displayed by executing a gallery application, the information used to automatically execute the application related to the target information may include gallery application information and an execution command of the gallery application. Setting communication between devices includes setting a communication activation state between devices.

The information used to automatically execute the application related to the target information may further include information used to execute an application for storing the target information. For example, the information used to automatically execute the application related to the target information may include a command for automatically executing the clipboard and/or a command for automatically storing the target information in the clipboard. The information used to automatically execute the application related to the target information included in the display area indicated by the dotted line 100 of FIG. 1 may include a URL of a web page, a command for executing a web browser, and/or information for automatically executing the clipboard.

When the information used to automatically execute the application related to the target information is included in the metadata of the target information, a device receiving the metadata of the target information may display a web page based on a URL by executing a web browser, and store the target information and/or the metadata of the target information in the clipboard by executing a clipboard application.

However, when the information used to automatically execute the application related to the target information is not included in the metadata of the target information, the target information and/or the metadata of the target information received according to an operating condition set in a device receiving the target information and/or the metadata of the target information may be automatically stored in a clipboard of the device. The operating condition set in the device is an operating condition that information received when communication between the device and an external input device is set is automatically stored in a clipboard.

Throughout the specification, an information transmission request is a request to transmit either target information selected in a first device or target information included in a selected display area to an external input device. The information transmission request may be referred to as a copy request with respect to the target information or a cut request with respect to the target information; in the former case preserving the target information in the first device upon request, in the latter removing the target information from the display of the first device once the request is effected.

Throughout the specification, a storage information transmission request is a request to transmit information stored in an external input device to a second device. The storage information transmission request may be referred to as a paste request or a storage request. The first device is a device selecting target information or a display area including the target information based on displayed information, detecting the selected target information or/and metadata of the selected target information from the screen or information related to the screen, and transmitting the detected target information and/or the detected metadata of the target information to an external input device. The screen or the information related to the screen may be stored in the first device, but is not limited thereto. The second device is a device receiving target information stored in the external input device and/or metadata of the target information. However, the device transmitting and receiving the target information is not limited to the first device and the second device described above.

The external input device is a tool for inputting information into the first device and the second device and is outside of, external to and/or separated from the first device and the second device. For example, a stylus or a stylus pen may be the external input device, as illustrated in FIG. 1. The first device and the second device may be different from each other or may be the same device. When the first device and the second device are the same, target information may be understood to be moved, copied or pasted to another screen or another display location on the same screen by using the external input device.

Throughout the specification, user input information may depend on a user gesture, a user voice signal, text and images expressed by using a touch tool, and physical button control.

The user gesture may be determined in various ways according to an input device. That is, when the input device is based on a touch screen, the user gesture may include a user touch based motion with respect to the touch screen such as a tap, a touch and hold, a double tap, a drag, a touch and drag, panning, a flick, a drag and drop, a sweep, a swipe, and the like, but is not limited thereto.

A user touch on the touch screen may be performed by a user using his/her finger or a touch tool. The touch tool may include the above-described external input device. When the touch tool is the external input device, a memo (in a text or image format) and marking information expressed by using the external input device may be based on user input information. The marking information may include the dotted line 100 drawn on a screen to indicate a selection status of target information as shown in FIG. 1. The dotted line 100 of FIG. 1 may be referred to as boundary line information for identifying the target information and non-target information. The marking information may include highlight information of a display area including the target information, looped curve information of a display area including the target information, or drag based block information of a display area including the target information, but is not limited thereto.

When an input device is based on a motion sensor, user input information may depend on a user gesture moving a device. The user gesture moving the device may include, for example, device shaking, device tapping, etc. The motion sensor may include one or more of acceleration sensor, a terrestrial magnetic sensor, a gyro sensor, and an orientation sensor.

When the input device is based on a camera, the user input information may include facial recognition based authentication information and user's hand based gesture information. Users hand based gesture information may include space gesture information based on an image captured by the camera. That is, the user's hand based gesture information relating to the user input information may be based on a space gesture or a space motion according to a movement direction or a sign of a hand included in image captured by the camera.

For example, a pointing location on a screen may be changed according to the movement direction of the hand and then, the changed pointing location on the screen may be determined when a user clenches his/her fist. If a plurality of pieces of content are at the determined pointing location on the screen, and the users hand opens from being in a fisted position and then moves to a direction, the plurality of pieces of content may be scattered and displayed on the screen to the direction. After the pieces of content are scattered and displayed on the screen, if the user's hand draws a circle in a counterclockwise direction, a return function is performed, and thus the screen on which the plurality of pieces of content are gathered at a location like a previous screen may be displayed. The camera may be based on an image sensor or a light sensor.

The above-described determination of the pointing location on the screen may be implemented in terms of a shape of a hand holding a stylus. For example, the pointing location on the screen may be determined based on the stylus held by the hand by using a 3D based gesture recognition method or may be determined based on a meaningful space gesture image of the hand holding the stylus. The 3D based gesture recognition method may be configured to obtain a left-eye image and a right-eye image from an image captured by a camera, detect 3D data by using the left-eye image and the right-eye image, and recognize a gesture based on the detected 3D data.

When the external input device includes one or more of a dial, a slider switch, a joystick, a click wheel, etc., as well as a physical button, the user input information may be dependent on physical control by the user with respect to the input device. When the external input device is based on an audio input device, the user input information may be dependent on a voice signal of the user based on a spoken language.

The exemplary embodiments will now be described more fully with reference to the accompanying drawings. Like reference numerals in the drawings denote like elements and thus their descriptions will not be repeated herein.

Figure 2:
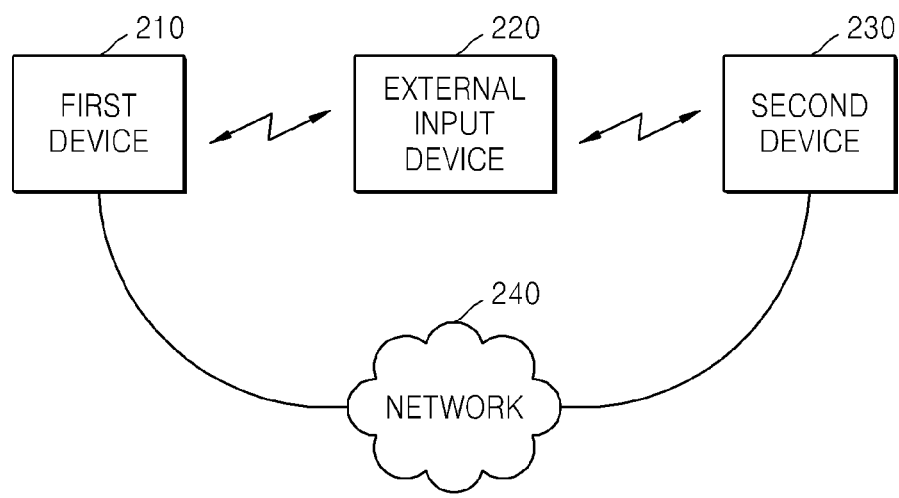
FIG. 2 illustrates a configuration of an information transmission system, according to an exemplary embodiment.

FIG. 2 illustrates a configuration of an information transmission system 200, according to an exemplary embodiment. Referring to FIG. 2, the information transmission system 200 includes a first device 210, an external input device 220, a second device 230, and a network 240.

FIG. 2 shows a case where the first device 210 transmits at least one piece of selected target information or target information included in at least one selected display area to the second device 230 through the external input device 220 and a case where if the first device 210 transmits metadata of the at least one piece of target information or metadata of the target information included in the at least one selected display area to the second device 230 through the external input device 220, the second device 230 receives target information from the first device 210 based on the metadata of the target information.

The first device 210 may receive user input information from the external input device 220 through short distance wireless communication. The first device 210 may receive the user input information based on a user gesture based on the first device 210, a physical button of the first device 210, and a sound recognition function of the first device 210. The first device 210 may also receive the user input information based on a user gesture based on the first device 210 and the external input device 220.

The first device 210 may be one or more of a smart phone, a notebook, a tablet personal computer (PC), a mobile device, a handheld device or a handheld PC, a smart TV, a digital consumer electronics (CE) device having a communication function and a display function, etc., but is not limited thereto. Examples of suitable short distance wireless communication technologies for the short distance wireless communication include near field communication (NFC), Zigbee®, Bluetooth®, and radio frequency identification (RFID).

When the first device 210 executes an application or displays a menu screen or a home screen, the first device 210 detects selected target information or target information included in a selected display area. To detect the target information, the first device 210 may select target information or a display area including the target information based on the touch based user input information by using the external input device 220 and/or the touch based user input information by using the first device, and detect the selected target information or target information included in a selected display area from the screen.

The first device 210 may detect metadata of the selected target information from information related to the screen. The first device 210 may detect a data amount of the selected target information or the target information included in the selected display area or the total amount (or the sum) of data of the target information and metadata of the target information. The target information selected from the menu screen or the home screen may be icons, files or other graphical or content items included in the menu screen or the home screen.

After the target information or the display area including the target information is selected based on the user input information, if information indicating "selection completed" is input by using the sound recognition function or using a function menu, the first device 210 may detect the data amount of the target information or the total data amount of the target information and the metadata of the target information as described above. A plurality of pieces of the target information or a plurality of the display areas may be selected. The plurality of pieces of the target information or the plurality of the display areas may be present on the same screen or different screens. The first device 210 may display information indicating a selection status of the selected target information or the selected display area on the screen, like the above-described marking information.

If an information transmission request signal regarding the target information is received from an external device, the first device 210 transmits at least one of the target information and the metadata of the target information to the external input device 220 through short distance wireless communication or another type of wireless communication. At least one of the target information and the metadata of the target information may include the target information, the target information and the metadata of the target information, or metadata of the target information. To this end, a short distance wireless communication function between the first device 210 and the external input device 220 may be activated.

The first device 210 may transmit the target information and/or the metadata of the target information to the external input device 220, based on the data amount of the target information or the total data amount of the target information and the metadata of the target information and a storage capacity of the external input device 220. For example, if the detected data amount of the target information is smaller than the storage capacity of the external input device 220, the first device 210 transmits the target information to the external input device 220. However, if the detected data amount of the target information is not smaller than the storage capacity of the external input device 220, the first device 210 transmits the metadata of the target information to the external input device 220.

Alternatively, if the detected total data amount of the target information and the metadata of the target information is smaller than the storage capacity of the external input device 220, the first device 210 transmits the target information and the metadata of the target information to the external input device 220. However, if the detected total data amount of the target information and the metadata of the target information is not smaller than the storage capacity of the external input device 220, the first device 210 transmits only the metadata of the target information to the external input device 220.

Information regarding the storage capacity of the external input device 220 may be received from the external input device 220 when communication is established between the first device 210 and the external input device 220, may be received from the external input device 220 along with the information transmission request signal, or may be received from the external input device 220 when the storage capacity of the external input device 220 is updated, but is not limited thereto.

The information transmission request signal may be received from the external input device 220 through short distance wireless communication, but is not limited thereto. The information transmission request signal may be received based on the user gesture based on the first device 210, the physical button of first device 210, and the sound recognition function of the first device 210.

That is, the information transmission request signal may be received based on at least one of the user input information that is input using the external input device 220 and the user input information based on the first device 210. For example, receiving the information transmission request signal when an information transmission request button mounted on the external input device 220 is activated may be regarded as receiving the information transmission request signal based on the user input information that is input using the external input device 220.

When a touch of the external input device 220 on the target information displayed on the first device 210 is detected, receiving a signal when the information transmission request button attached to the external input device 220 is activated may be regarded as receiving the information transmission request signal according to the user input information that is input using the external input device 220 and the user input information based on the first device 210.

With regard to the information transmission request signal based on the user input information based on the first device 210, for example, if the selected target information or the selected display area displayed on the first device 210 is touched twice and dragged in a direction more than a predetermined length while maintaining touching, the first device 210 may recognize receiving the information transmission request signal regarding the selected target information or target information included in the selected display area but the exemplary embodiments are not limited thereto.

With regard to the information transmission request signal based on the physical button of the first device 210, for example, if a hot key on a side or bezel of the first device 210 or a specific hardware button thereof is controlled, the first device 210 may recognize receiving the information transmission request signal regarding the selected target information or the target information included in the selected display area.

With regard to the information transmission request signal based on the sound recognition function of the first device 210, for example, if the sound recognition function of the first device 210 is activated and a sound signal "send target information" or an indication to send target information by pointing out a name of the target information is received, the first device 210 may recognize receiving the information transmission request signal.

The first device 210 may determine whether to transmit target information, based on authentication information of the external input device 220, and transmit the target information and/or metadata of the target information to the external input device 220 according to a result of the determination. The authentication information of the external input device 220 may include security level information. The security level information of the external input device 220 may be used to determine whether to transmit target information to the external input device 220 according to a location of the first device 210 when the first device 210 receives an information transmission request. The security level may also be used to determine the types of target information that may be transmitted from the first device based on the security level of the external input device 210 and the second device 230.

For example, in case where the first device 210 determines the location is an office as the security level information included in the authentication information set in the external input device 220, when the first device 210 receives the information transmission request, if a current location of the first device 210 is not the office, the first device 210 does not transmit at least one of the target information and the metadata of the target information to the external input device 220.

However, when the first device 210 receives the information transmission request, if the current location of the first device 210 is the office, the first device 210 determines the authentication information set in the external input device 220. If the authentication information set in the external input device 220 is authentication information that allows transmission, the first device 210 transmits at least one of the target information and the metadata of the target information to the external input device 220 according to an exemplary embodiment.

When the first device 210 receives the information transmission request, if the current location of the first device 210 is the office, and the authentication information set in the external input device 220 is authentication information that does not allow transmission, the first device 210 does not transmit the target information or the metadata of the target information to the external input device 220. To this end, the first device 210 may store an authentication information table for authentication processing on the external input device 220. The authentication information table may be configured to include the security level information.

If the first device 210 receives the information transmission request signal regarding the above target information from the second device 230 over the network 240, the first device 210 transmits the above target information to the second device 230 over the network 240. In this regard, the second device 230 may receive the metadata of the target information from the external input device 220 and the external input device 220 may initiate the transmission of the target information on the second device 230 by providing an input to the second device 230.

The external input device 220 may be a tool for inputting information into the first device 210 and the second device 230 based on a touch of a pen. The external input device 220 may be mounted on the first device 210 and the second device 230, respectively. The external input device 220 may include a stylus or a stylus pen as described above. The external input device 220 may transmit information to the first device 210 and the second device 230 through short distance wireless communication.

The external input device 220 may transmit an information transmission request signal to the first device 210 based on a touch using the pen or short distance wireless communication function, and transmit information stored in the external input device 220 to the second device 230 according to a stored information transmission request signal regarding the external input device 220.

If at least one of target information and metadata of the target information is received from the first device 210 through short distance wireless communication, the external input device 220 stores the received at least one of the target information and metadata of the target information. The received information may include information regarding a plurality of pieces of target information. To this end, the external input device 220 may include an element such as an NFC chip including a memory.

The external input device 220 transmits stored information, through short distance wireless communication, to the second device 230. In this regard, the external input device 220 may previously designate or select a location of the second device 230 that is to receive the target information. The location of the second device 230 may be designated according to user input information that is input via a touch based user gesture on the second device 230. The location of the second device 230 may be designated by a user, based on the target information. The location of the second device 230 may be referred to as a display location on the second device 230. The location information may also be the directory, folder, playlist etc. where the user wants to copy the target information, content or item being transferred.

The second device 230 may have a short distance wireless communication function and receive input information via the external input device 220. The second device 230 may receive the input information based on the above-described user gesture, a physical button of the second device 230, and a sound recognition function of the second device 230.

The second device 230 may be a smart phone, a notebook, a tablet PC, a mobile device, a handheld device or a handheld PC, a smart TV, a digital CE device having a communication function and a display function, etc., but is not limited thereto.

The second device 230 may receive the information stored in the external input device 220 based on short distance wireless communication when communication between the second device 230 and the external input device 220 is established, and execute an application related to the target information based on the received information.

The second device 230 may execute a clipboard function or application and store the target information and/or metadata of the target information received from the external input device 220 in the clipboard when communication between the second device 230 and the external input device 220 is established according to a set operating condition. However, in case where the operating condition is not set in the second device 230, when at least one of the target information and the metadata of the target information received from the external input device, and a command for automatically executing the clipboard or a command for automatically storing information in the clipboard received from the external input device, the second device 230 may store at least one of the target information and the metadata of the target information in the clipboard and display the clipboard on the second device 230. The command may be received and included in the metadata of the target information from the external input device 220.

After the application is executed, if user input information regarding the display location on the second device 230 to which the target information is to be pasted is received, the second device 230 may paste the target information stored in the clipboard to the display location. To paste the target information on the display location may mean to display the target information on the display location. If the metadata of the target information has no information regarding the application related to the target information, the second device 230 may not execute the application but may execute the clipboard and store the target information and/or the metadata of the target information in the clipboard. In addition, if the metadata of the target information has no information regarding the application related to the target information, the second device 230 may not execute the application but may execute a default application preset in the memory of the second device 230 and place the target information and/or the metadata of the target information into the default application.

If the user input information regarding the display location on the second device 230 to which the target information is to be pasted is received as described above, the second device 230 pastes the target information stored in the clipboard to the display location. The user input information regarding the display location may be received before receiving the information related to the target information from the external input device 220 as described above, or the user input information regarding the display location may be received after receiving the information related to the target information from the external input device 220, storing the information related to the target information in the clipboard, and executing the application as described above.

After storing the metadata of the target information in the clipboard, when the user input information regarding the display location is received, the second device 230 may request to transmit the target information from the first device 210 over the network 240 by using the metadata of the target information stored in the clipboard. When the target information is received from the first device 210, the second device 230 may paste the target information to the display location directly or after storing the target information in the clipboard.

When the target information is displayed during the execution of a specific application, the second device 230 may not automatically execute the application related to the target information according to the operating condition set to the second device 230 but may store the target information in the clipboard. In this case, after designating the display location according to the user input information as described above, the second device 230 may paste the target information stored in the clipboard to the designated display location, or may receive the target information from the first device 210 over the network 240 as described above and paste the received target information to the designated display location. In this regard, the application executed when the first device 210 selects the target information and the application executed when the second device 230 pastes the target information may be different from each other. For example, when the first device 210 selects information B displayed when executing an application A as the target information, the second device 230 may execute an application C on a menu screen or a home screen and paste information B to the designated display location.

As described above, when the display location is not designated and the target information and/or the metadata of the target information are stored in the clipboard of the second device 230, the second device 230 may output an alarm message indicating that information relating to the target information is received. After outputting the alarm message, when the display location is designated according to the user input information of the second device 230, the target information may be pasted to the designated display location as described above.

The user input information based on the physical button of the second device 230 may be received by controlling a hot key on the side or bezel of the second device 230 or a specific hardware or software button thereof or a combination button of hardware and software.

When the information received from the external input device 220 is the metadata of the target information, the second device 230 establishes a communication channel with the first device 210 over the network 240. The second device 230 requests to transmit the target information based on the metadata of the target information as described above from the first device 210 via the established communication channel. Thus, the second device 230 pastes the target information received from the first device 210 to the display location. However, when there is no designated display location, the second device 230 may store the target information received over the network 240 in the clipboard or a memory (not shown) included in the second device 230.

Figure 13:
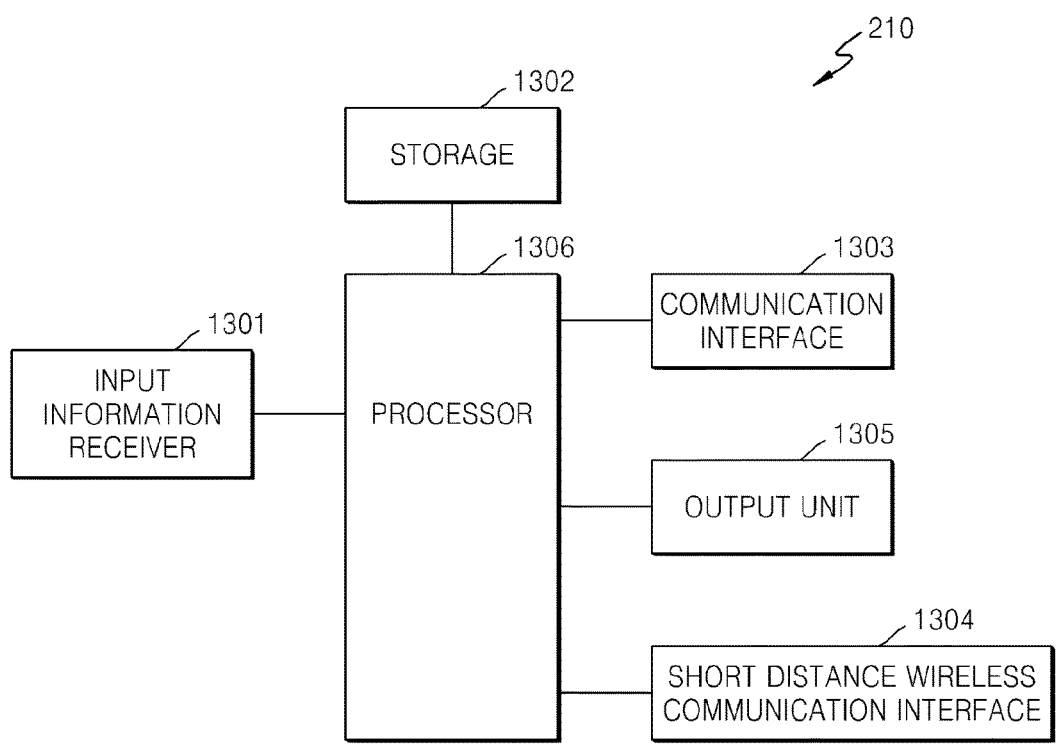
FIG. 13 is a block diagram of an example of a first device of FIG. 2.

The network 240 may be one or more of a wired network and a wireless network. The network 240 will be described in detail later when a communication unit 1303 of FIG. 13 is described.

FIG. 3 is a flowchart of an information transmission method, according to an exemplary embodiment, based on the information transmission system of FIG. 2. FIG. 3 shows a case where the first device 210 transmits target information or the target information and metadata of the target information to the second device 230 through the external input device 220. FIG. 3 shows an example where a data amount of target information or a total data amount of the target information and metadata of the target information is not greater than a storage capacity of the external input device 220. FIG. 3 shows an example where communication between the first device 210 and the external input device 220 and communication between the external input device 220 and the second device 230 are short distance wireless communication. In alternative embodiments, one or other or both communications may be established using another wireless communication method, such as WiFi or cellular telecommunication methods.

Referring to FIG. 3, in operation S301, short distance wireless communication between the first device 210 and the external input device 220 is established. In one implementation of this embodiment, the short distance wireless communication may be automatically established as NFC if a distance between the first device 210 and the external input device 220 is equal to or shorter than a predetermined distance. When the predetermined distance is set at 10 cm, if the distance between the first device 210 and the external input device 220 is equal to or shorter than 10 cm, short distance wireless communication between the first device 210 and the external input device 220 is established.

Communication between the first device 210 and the external input device 220 is not limited to the NFC based short distance wireless communication. For example, communication between the first device 210 and the external input device 220 may be performed based on Bluetooth low energy (BLE). When the NFC based short distance wireless communication is automatically established between the first device 210 and the external input device 220, power of the external input device 220 may be supplied from the first device 210 through short distance wireless communication.

In operation S302, the first device 210 selects target information or a display area including the target information and detects the selected target information or the selected display area as described with reference to FIG. 2. For convenience of description, the target information included in the selected display area may be referred to as the selected target information. To select and detect the target information or the display are including the target information from the screen displayed on the first device 210 may mean to determine the target information or the display area including the target information from the screen displayed on the first device 210 according to user input information.

Figure 4A:
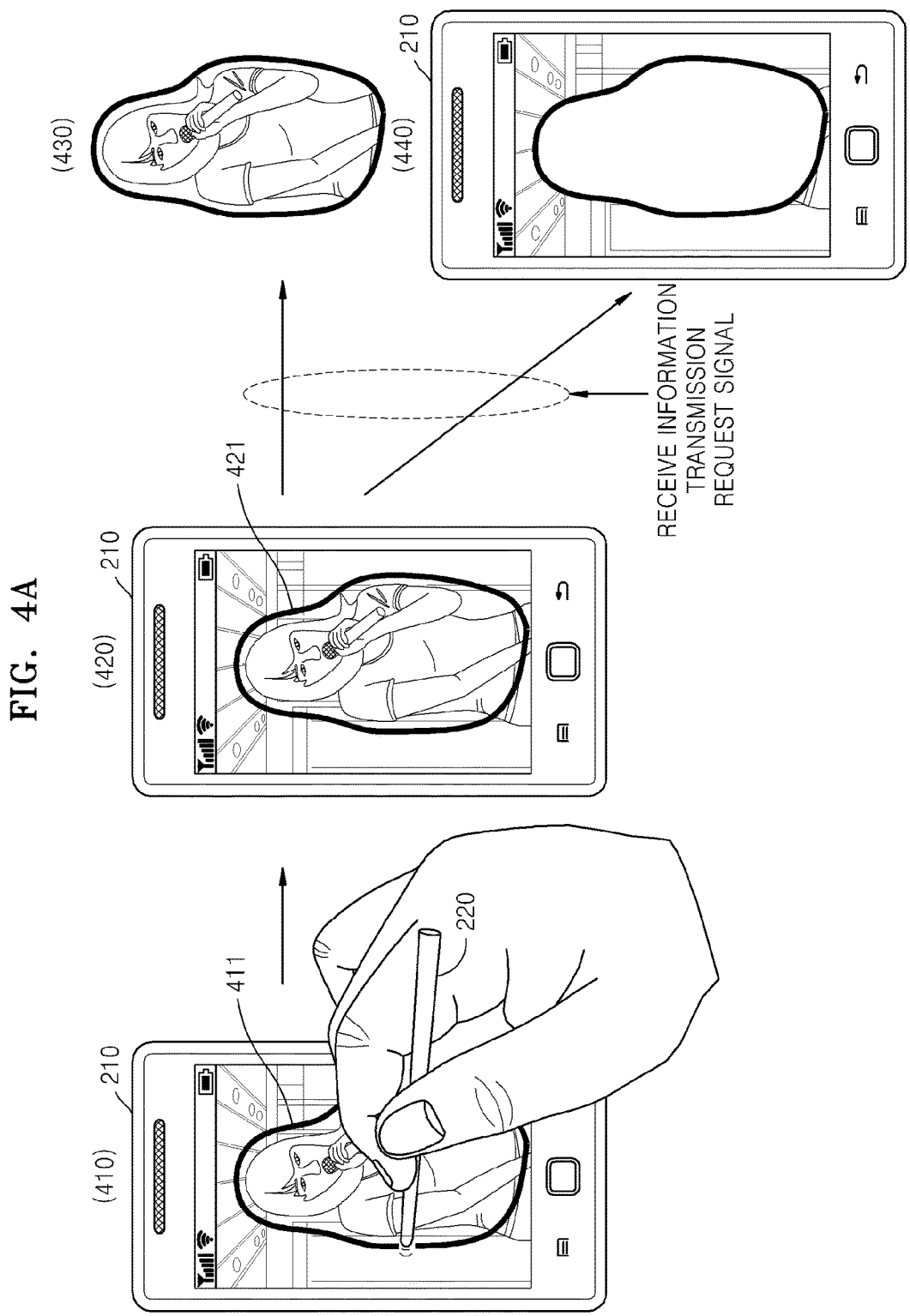

FIGS. 4A and 4B show screen examples for explaining selection and transmission of target information, according to an exemplary embodiment.

A screen 410 of FIG. 4A shows an example where the target information is selected based on user input information while the external input device 220 touches a displayed screen. The user input information may be based on an operation 411, in which the target information is cut from the screen 410. As the operation 411 in which cutting the target information from the screen 410 is completely performed, when a touch of the external input device 220 is not detected from the screen 410, the first device 210 recognizes selection of a display area 421 from the screen 420, and detects the target information included in the display area 421. A boundary line of the display area 421 on the screen 420 may be referred to as information indicating a selection status of the target information mentioned in the above-described marking information.

A screen 450 of FIG. 4B shows an example where target information is selected based on user input information corresponding to a drawing operation 451 along an outline of the target information while the external input device 220 is touched. As the drawing operation along the outline 451 of the target information is completely performed, when a touch of the external input device 220 is not detected from the screen 450, the first device 210 recognizes selection of the target information included in the outline 451, and detects the selected target information.

FIG. 5 shows examples of screens for explaining selection of the target information, according to an exemplary embodiment. The first device 210 may select and detect target information 511, 521, and 531 from a plurality of screens 510, 520, and 530 as shown in FIG. 5. The target information 511, 521, and 531 may be selected, as shown in the screens 410 and 450 of FIGS. 4A and 4B, respectively, based on the user input information that is the operation like cutting the target information after touching the external input device 220 on the display areas 421 and 461 including the target information. However, the target information 511, 521, and 531 may be selected based on user input information that is input as a long or double touch on display areas including the target information 511, 521, and 531 by using the external input device 220. The selection of target information is not limited thereto.

Figure 6:
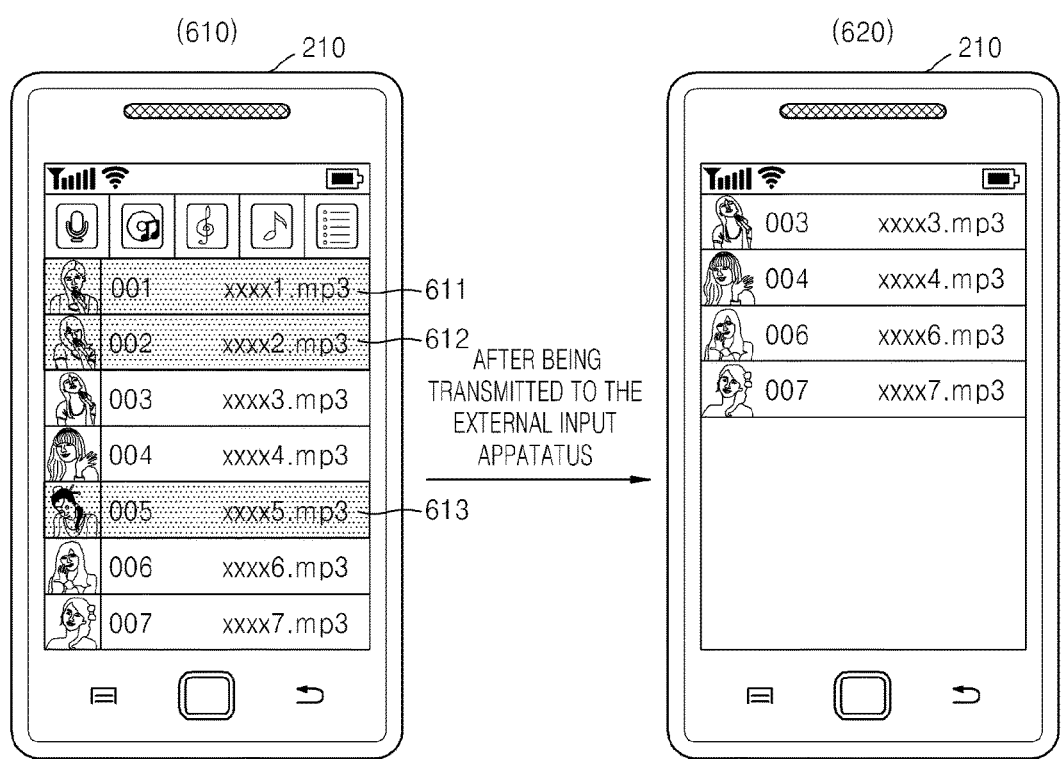
FIG. 6 shows screen examples for explaining selection of target information by a first device, according to an exemplary embodiment.

FIG. 6 shows screen examples for explaining selection and transmission of target information, according to an exemplary embodiment. The first device 210 may select target information 611, 612, and 613 from a reproduction list screen 610 of FIG. 6 and detect the selected target information 611, 612, and 613. If the first device 210 receives user input information according to a double touch of the external input device 220 or a long touch of the external input device 220 or a block based on a drag of the external input device 220 on the target information 611, 612, and 613, the first device 210 may select and detect the target information 611, 612, and 613. The target information may include content items in a playlist or file list.

A screen 620 of FIG. 6 is an example where the selected target information 611, 612, and 613 are deleted from the first device 210 after being transmitted to the external input device 220. However, after the selected target information 611, 612, and 613 are transmitted to the external input device 220, the first device 210 may maintain the screen 610 or display a screen from which highlights regarding the selected target information 611, 612, and 613 disappear.

The user input information for selecting the target information in FIGS. 4A, 4B, 5, and 6 is not limited to a touch performed by using the external input device 220. For example, the target information may be selected based on a users finger based touch or a space gesture. The touch method using the above-described external input device 220 for selecting the target information is not limited thereto. The information indicating the selection status of the target information may be displayed as highlight information as shown on the screen 610 of FIG. 6, may be displayed as boundary line information or looped curve information as shown in FIGS. 4A, 4B, and 5, or may be drag based block information, but is not limited thereto. The drag based block information may be used to indicate the selection status of the target information 611 and 612 of FIG. 6.

In operation S303, when a hardware button installed in the external input device 220 is controlled, in operation S304, the first device 210 receives an information transmission request signal from the external input device 220. In operation S305, the first device 210 transmits the detected target information or the detected target information and the metadata of the detected target information to the external input device 220.

When the external input device 220 transmits the information transmission request signal to the first device 210 as described above, the external input device 220 may transmit the authentication information of the above-described external input device 220. Thus, the first device 210 may determine whether to transmit the detected target information or the detected target information and metadata of the detected target information to the external input device 220 according to a result obtained by performing an authentication process by using the authentication information of the external input device 220.

The first device 210, as shown in FIG. 4A, may detect target information 430 by cutting the display area 421 from the screen 420 and transmit the target information 430 to the external input device 220. Thus, a screen of the first device 210 may be changed from the screen 420 to a screen 440. However, the first device 210 may transmit the detected target information 430 to the external input device 220 by copying the detected target information 430. In this case, the screen displayed on the first device 210 may be maintained as the screen 420 or may be changed to a screen displaying an original image by deleting boundary line information indicating the display area 421 from the screen 420. After receiving the information transmission request signal from the external input device 220, if the first device 210 detects a touch on a point 452 of the target information 461 of FIG. 4B selected using the external input device 220, the first device 210 may display pointing information indicating that the point was touched. The pointing information may be displayed as a shadow circle indicating a predetermined area with respect to the touched point 452, but is not limited thereto.

During the transmission of the selected target information 461 to the external input device 220, the first device 210 may change a display status of the selected target information 461 to present a transmission status of the selected target information 461. For example, as shown on screens 470 and 480 of FIG. 4B, the first device 210 may change the display status of the selected target information 451 as if the selected target information 451 is gradually absorbed by the external input device 220 based on the point 452 touched by the external input device 220.

To this end, the first device 210 may include a filtering program for gradually distorting an image of the selected target information 461 or a hardware element corresponding to the filtering program. A number of frames of a screen indicating a gradual distortion of the image of the selected target information 461 may be determined based on an information transmission speed over a short distance communication network between the first device 210 and the external input device 220, but is not limited thereto.

If the selected target information 461 is transmitted to the external input device 210, the first device 210 may display a screen 490 from which the selected target information 461 is deleted, maintain the screen 450 as shown in FIG. 4A, or display a screen from which outline information 451 of the selected target information 461 of the screen 450 is deleted. Areas 471, 481, and 491 on the screens 470, 480, and 490 are where the target information 461 was displayed. The areas 471, 481, and 491 show gradually increasing empty areas as shown on the screens 470 and 480 as the target information 461 is gradually absorbed. If the target information 451 is completely transmitted, the display area of the selected target information 461 becomes a wholly empty area as shown in the area 491 on the screen 490. The display areas 471, 481, 491 on the screens 470, 480, and 490 may be display areas having different degrees of emptiness. For example, the target information may be animated so as to appear as it is being absorbed or suctioned up by the external input device 220 or another animation may be performed on the target information so that it slowly shrinks into the area touched by the external input device 220 until the target information is no longer visible.

Figure 4C:
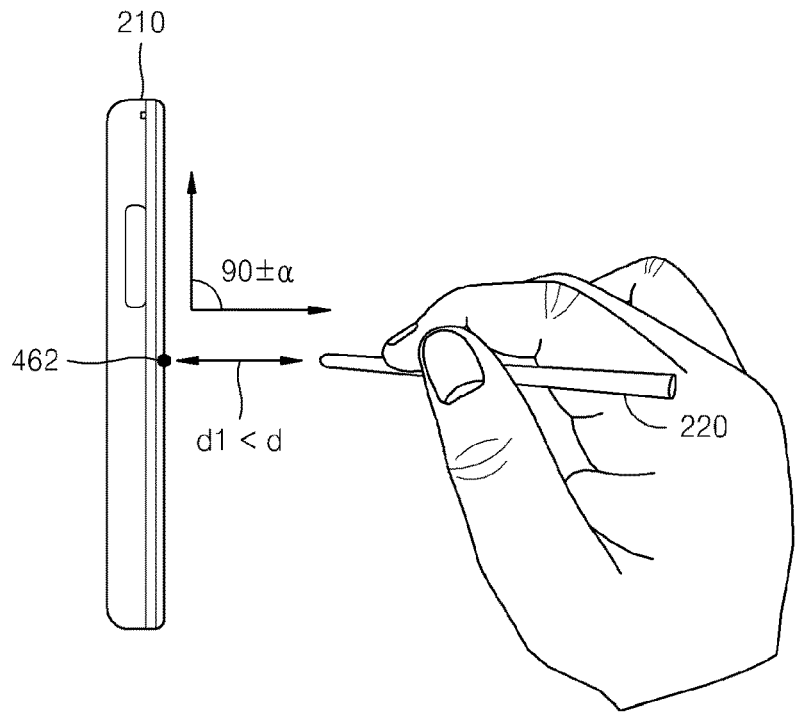
Figure 4D:
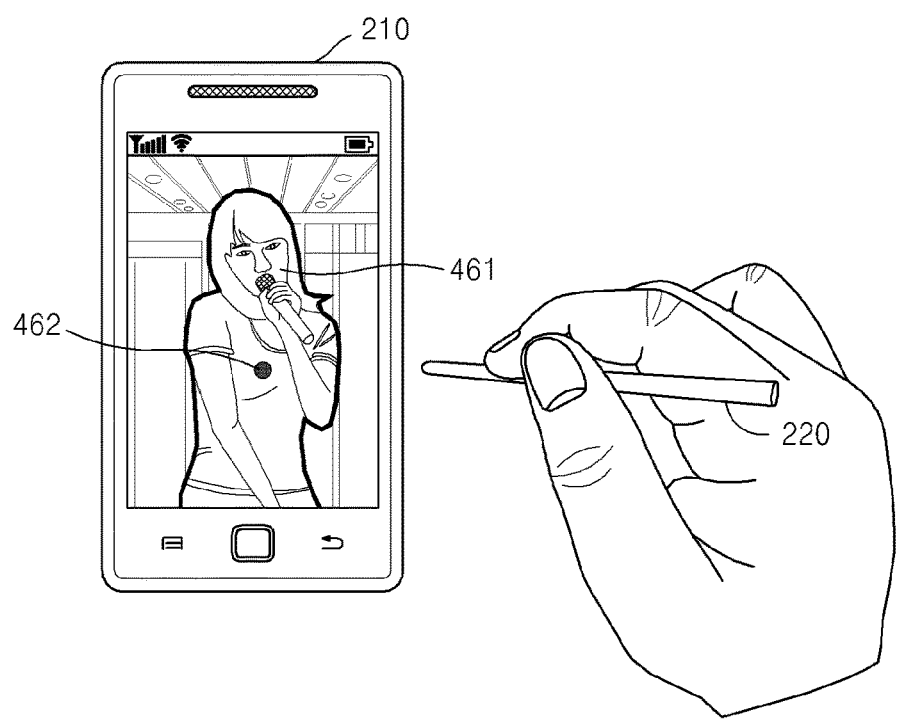

Displaying the pointing information on a screen 460 of FIG. 4B is not limited to a touch of the external input device 220. For example, as shown in FIG. 4C, according to the above-described camera based user space gesture recognition method, when a distance dl between the first device 210 and the external input device 220 is within a distance d for performing short distance wireless communication, and an angle between a display side of the first device 210 and the external input device 220 is recognized within a previously set angle (for example, an angle within 90±α degrees), a display location on the first device 210 pointing with the external input device 220 may be recognized as a pointing location 462 by the external input device 220 and displayed as shown in FIG. 4D. However, recognizing a pointing location on the first device 210 is not limited thereto when the external input device 220 does not touch the display side of the first device 210.

When there is a plurality of pieces of selected target information 511, 521, and 531, as shown in FIG. 5, in operation S305, first device 210 may continuously transmit the plurality of pieces of selected target information 511, 521, and 531 according to a selection order to the external input device 220. For example, when the selected target information 511, 521, and 531 of FIG. 5 are selected in an order of 511, 521, and 531, the first device 210 transmits the selected target information 511, 521, and 531 to the external input device 220 in the order of 511, 521, and 531. However, the target information 511, 521, and 531 may also be transmitted in another predetermined order or random order.

When there is a plurality of pieces of selected target information 511, 521, and 531 as shown in FIG. 5, in operation S305, whenever an information transmission request signal is received from the external input device 220, the first device 210 may transmit target information selected by the external input device 220 to the external input device 220. For example, when the information transmission request signal of the external input device 220 is received, if the external input device 220 is touched with respect to the selected target information 511 of FIG. 5, the first device 210 transmits the selected target information 511 to the external input device 220. In this regard, to show a transmission status, an image of the target information 511 displayed on the first device 210 may be changed as if the selected target information 511 is absorbed by the external input device 220 as shown on the screens 470 and 480 of FIG. 4B.

After the target information 511 is transmitted to the external input device 220, if the information transmission request signal is received when the external input device 220 touches the selected target information 523, the first device 210 transmits the target information 521 to the external input device 220 like in the case of the target information 511. After the target information 521 is transmitted to the external input device 220, if the information transmission request signal is received when the external input device 220 touches selected target information 531, the first device 210 transmits the target information 531 to the external input device 220 like the target information 511. The selected plurality of pieces of target information may be included in each others screens as shown in FIG. 5, but may be included in the same screen.

In operation S306, the external input device 220 stores the target information or the target information and the metadata of the target information received from the first device 210. The external input device 220 may display status information of a storage space of the external input device 220 while storing the target information or the target information and the metadata of the target information.

Figure 7:
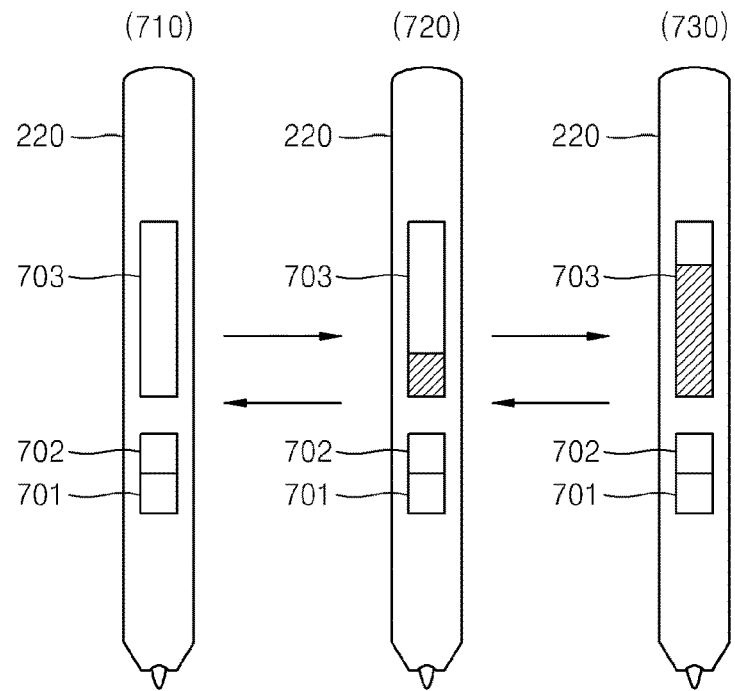
FIG. 7 shows examples of an appearance of an external input device, according to an exemplary embodiment.

FIG. 7 shows examples of an appearance of the external input device 220 having a function of displaying status information of a storage space of the external input device 220. The external input device 220 of FIG. 7 includes an information transmission request button 701, a storage information transmission request button 702, and a display 703 configured to display the status information of the storage space of the external input device 220. Although the information transmission request button 701 and the storage information transmission request button 702 are independent from each other in FIG. 7, they may be configured as one button.

When the information transmission request button 701 and the storage information transmission request button 702 are configured as one button, for example, a button control function may be configured to press the button once for an information transmission request and press the button twice for a storage information transmission request. When the information transmission request button 701 and the storage information transmission request button 702 are configured as one button, for example, a button control function may be configured to press one-side (for example, an upper side) of the button for an information transmission request and press other-side (for example, a lower side) of the button for a storage information transmission request.

Thus, when short distance wireless communication is established between the first device 210 and the external input device 220, if the information transmission request button 701 of the external input device 220 is controlled, the external input device 220 transmits an information transmission request signal to the first device 210 as described above based on short distance wireless communication.

As a data amount stored in the storage space of the external input device 220 increases, a display status of the display unit 703 may be changed in an order of 710, 720, and 730. The display status of the display 703 may be expressed as a gradually changing image similar to a solution being filled in a spout. The changing image may be linked with the screens 470 and 480 of FIG. 4B. The display status of the display unit 703 may be expressed as text changing based on number information. For example, the number information indicating what percentage of the total storage space is filled may be displayed on the display 703.

The display 703 of FIG. 7 may be implemented to display a non-authenticable message even when a result obtained by authenticating the external input device 220 in the first device 210 or the second device 230 is determined to be non-authenticable. The non-authenticable message may be provided in image or text form.

Figure 8:
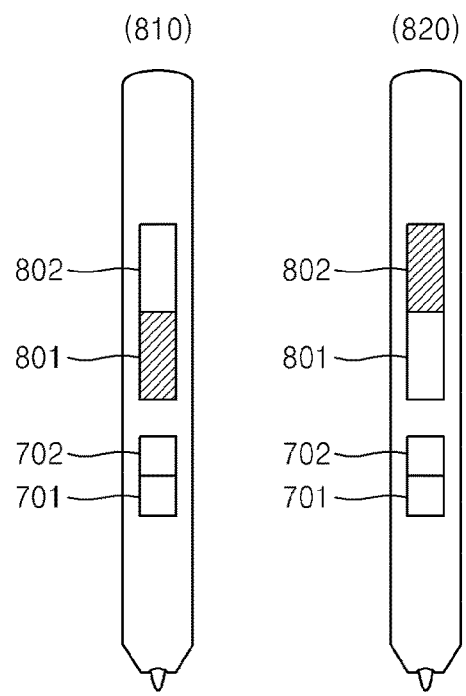
FIG. 8 shows examples of an appearance of an external input device, according to an exemplary embodiment.

FIG. 8 shows examples of an appearance of the external input device 220 having a function of displaying status information of a storage space of the external input device 220. 810 of FIG. 8 shows an example where information indicating a storage complete status of information transmitted from the first device 210 to the external input device 220 is displayed on an area 801. 820 of FIG. 8 shows an example where information indicating a transmission complete status of information transmitted from the external input device 220 to the second device 230 is displayed on an area 802. The areas 801 and 802 may be configured using a light emitting diode (LED). Although the areas 801 and 802 are independent from each other in FIG. 8, the areas 801 and 802 may be configured as one display area to display information based on different colors for indicating the storage complete status and a transmission complete status. The external input device 220 may have both a function of displaying a data amount stored in the storage space of the external input device 220 and displaying a transmission complete status information and/or a storage complete status information.

If a receiving location of target information is designated by the external input device 220 or by another input tool, the second device 230 may determine the receiving location (operation S307). The receiving location of target information may be referred to as a display location of target information on the second device 230. The receiving location may be determined before or after short distance wireless communication is established between the second device 230 and the external input device 220. For example, when the receiving location is designated by a users finger based touch on a screen displayed on the second device 230, the receiving location may be determined before short distance wireless communication is established between the second device 230 and the external input device 220. However, when the receiving location is designated based on the external input device 220, the receiving location may be determined after short distance wireless communication is established between the second device 230 and the external input device 220.

In operation S308, when short distance wireless communication is established between the second device 230 and the external input device 220, and, in operation S309, the storage information transmission request button 702 of the external input device 220 is controlled, in operation S310, the information stored in the external input device 220 is transmitted to the second device 230. The information stored in the external input device 220 may be transmitted to the second device 230 by a read request signal of the second device 230. That is, when the storage information transmission request signal is transmitted from the external input device 220 to the second device 230 through short distance wireless communication according to control of the storage information transmission request button 702, the read request signal is transmitted from the second device 230 to the external input device 220. In operation S311, the second device 230 displays and/or stores the target information received from the external input device 220.

Figure 9A:
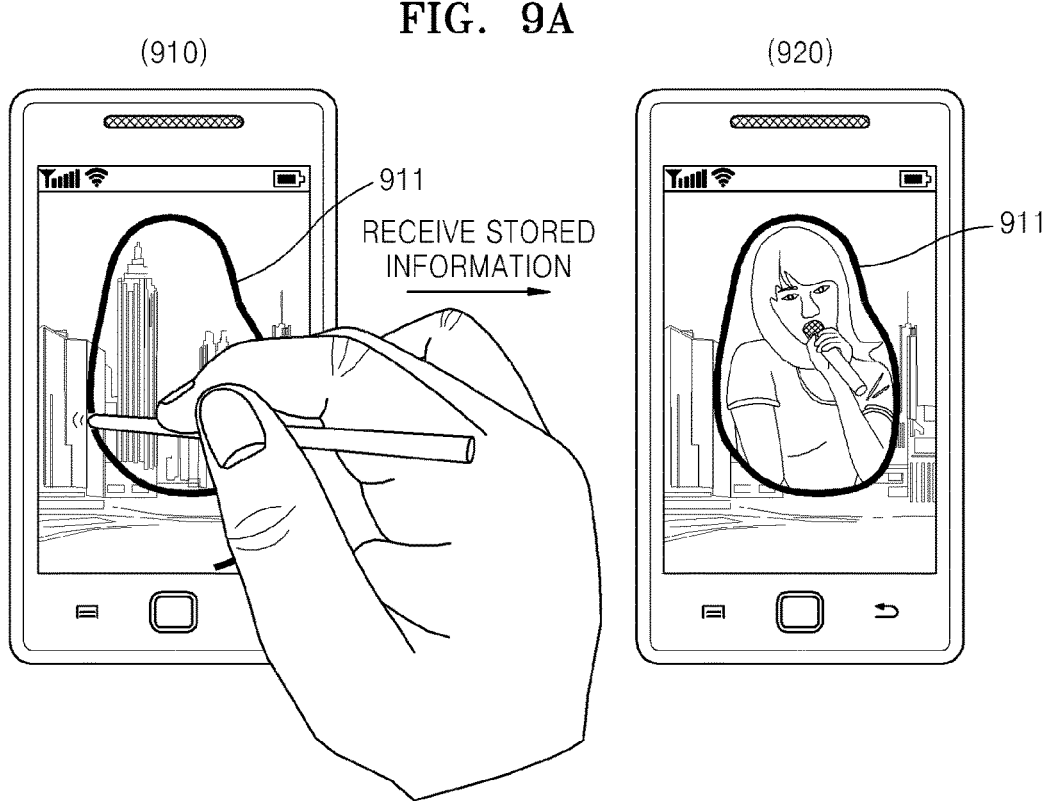
FIGS. 9A through 9C show screen examples for explaining selection and display of a receiving location by a second device.
Figure 9B:
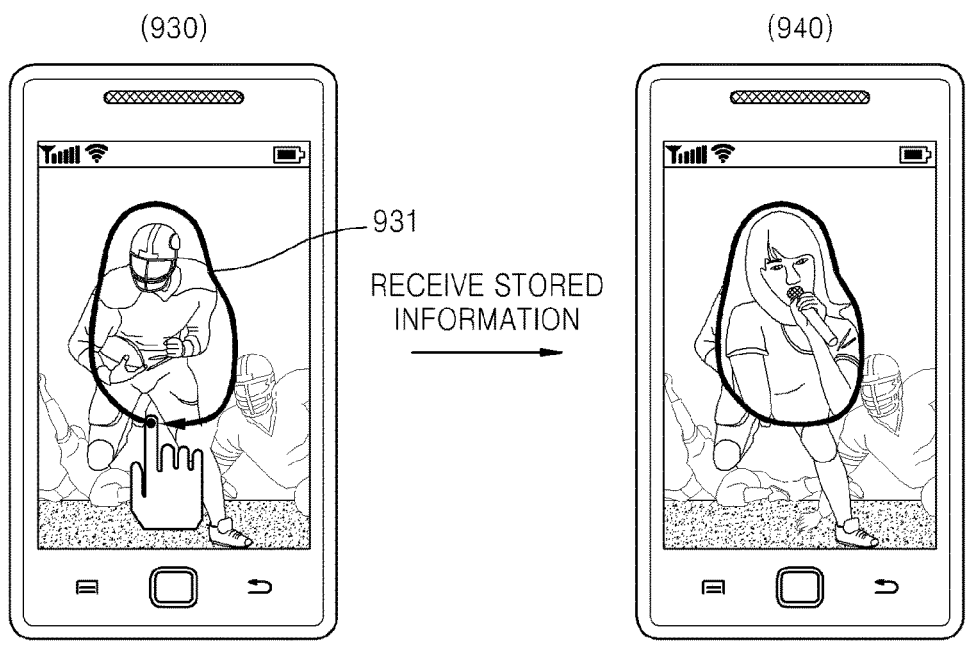
Figure 9C:
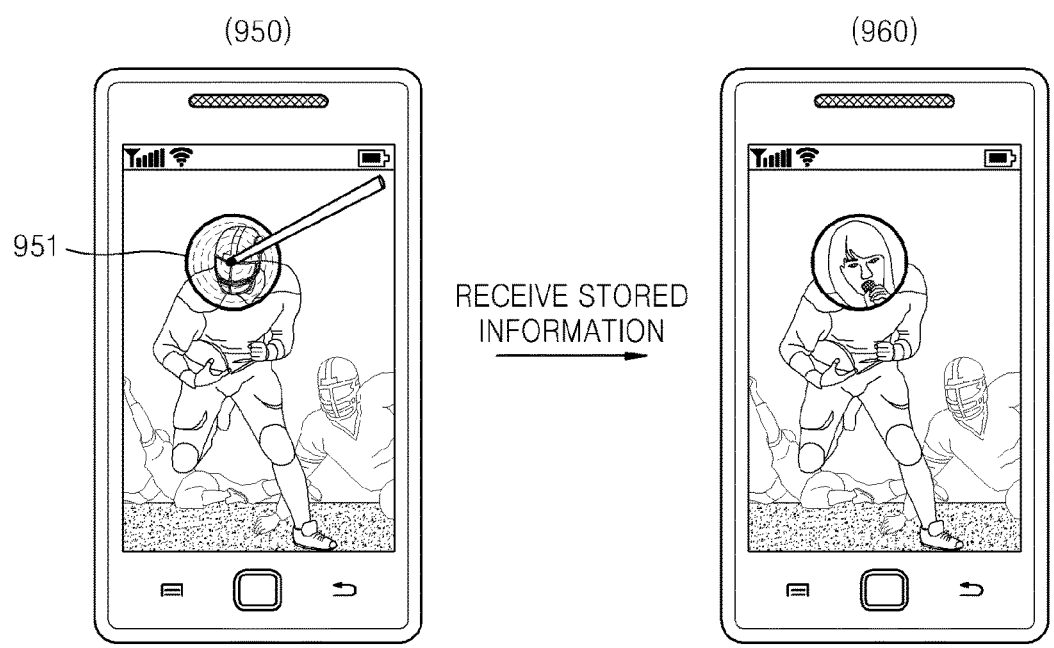

FIGS. 9A through 9C show screen examples for explaining displaying of target information received on a designated receiving location of the second device 230, according to an exemplary embodiment.

Referring to FIG. 9A, when a screen 910 is displayed on the second device 230, if a display location 911 is designated by using the external input device 220, the screen 910 is changed to a screen 920. That is, the received target information is displayed on the display location 911 designated on the second device 230.

Referring to FIG. 9B, when a screen 930 is displayed on the second device 230, if a display location 931 is designated based on a user's finger touch, the screen 930 is changed to a screen 940.

Referring to FIG. 9C, when a screen 950 is displayed on the second device 230, if a display location 951 that is to be displayed the received target information is selected by the external input device 220, the screen 950 is changed to a screen 960.

FIGS. 9A through 9C are used to explain a difference between displayed screens when different methods and different display locations are designated and the same target information is received. Display conditions of the received target information may be different according to designated displayed locations. In particular, in FIG. 9C, when one location is selected as a display location, a center point of a display area of the received target information may correspond to the selected location, and the received target information may be entirely seen by scrolling up and down the screen or may be entirely displayed within a predetermined display area based on the selected location.

Figure 10A:
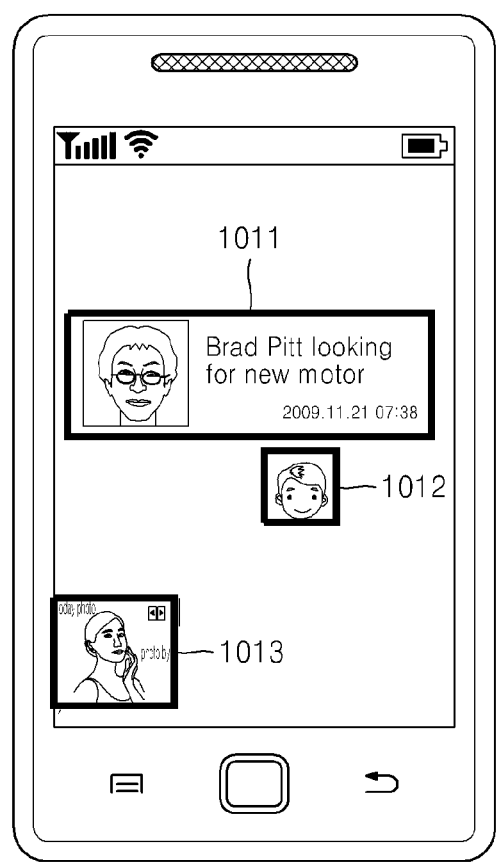
FIGS. 10A and 10B show examples of a screen displayed on a second device when there is a plurality of pieces of target information.

When target information received from the external input device 220 includes the selected plurality of pieces of target information 511, 521, and 531 of FIG. 5, the second device 230 may display received target information on one screen as shown in FIG. 10A. FIG. 10A shows a case where display locations of a plurality of pieces of received target information are designated on one screen. In FIG. 10A, target information is transmitted in an order of 511, 521, and 531, and display locations are designated in an order of 1011, 1012, and 1013.

Figure 10B:
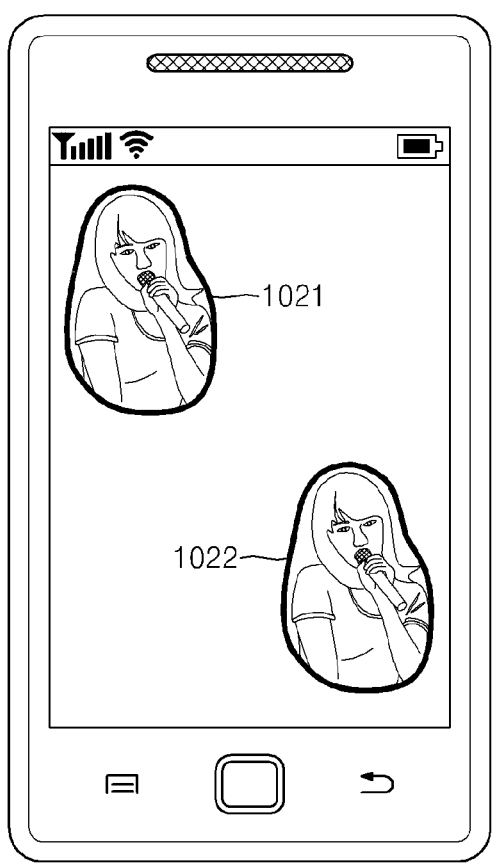

FIG. 10B shows a case where a plurality of display locations 1021 and 1022 are designated and one piece of the target information 421 of FIG. 4A is received.

However, when there is a plurality of pieces of target information, the second device 230 may designate display locations such that the plurality of pieces of received target information are respectively displayed on a plurality of different screens.

When there is a plurality of pieces of target information as shown in FIG. 10A, and a plurality of display locations are set in the second device 230, whenever the storage information transmission request button 702 of the external input device 220 is in an active state, the target information may be transmitted to the second device 230 according to an order of the target information stored in the external input device 220, and the target information may be displayed on the display locations designated in the second device 230.

That is, when the target information of FIG. 10A is stored in the external input device 220 according to an order of the display locations 1012, 1013, and 1011, the second device 230 detects a touch of the external input device 220 on the display location 1012 and displays received target information on the display location 1012 as the storage information transmission request button 702 is activated. When the second device 230 detects a touch of the external input device 220 on the display location 1013, the second device 230 displays received target information on the display location 1013 as the storage information transmission request button 702 is activated. When the second device 230 detects a touch of the external input device 220 on the display location 1011, the second device 230 displays received target information on the display location 1011 as the storage information transmission request button 702 is activated.

When the storage information transmission request button 702 is activated, the external input device 220 may transmit a signal indicating that the storage information transmission request button 702 is activated to the second device 230 before transmitting the target information to the second device 230.

When the received target information is displayed on the display location 911 of FIG. 9A, the display location 931 of FIG. 9B, the display location 951 of FIG. 9C, the display locations 1011, 1012, and 1013 of FIG. 10A, and the display locations 1021 and 1022 of FIG. 10B, the second device 230 may gradually completely change display images of the displayed target information as if the received target information inversely to displayed on the screens 470 and 480 of FIG. 4B is poured from the external input device 220 to the second device 230.

To this end, the second device 230 may include a filtering program for distorting an image of received target information or a hardware element corresponding to the filtering program. The filtering program or the hardware element corresponding to the filtering program included in the second device 230 may be configured to perform inverse processing on the received target information, which is inverse to the processing performed in the first device 210. The inverse processing may be performed according to an information transmission speed based on a communication service set between the external input device 220 and the second device 230.

In the above-described operation S308, S309, or S310, the external input device 220 may transmit authentication information of the external input device 220 to the second device 230. In this case, the second device may determine whether to receive or store information stored in the external input device 220 according to a result obtained by authenticating the authentication information of the external input device 220 as described with reference to the first device 210.

To this end, the second device 230 may store an authentication table for performing authentication as described with reference to the first device 210. The authentication table may be configured in consideration of security level information as described with reference to the first device 210. The authentication information received from the external input device 220 may include the security level information used to identify a security level of the second device 230 based on location information of the second device 230 when an information transmission request signal is generated.

In FIG. 3, when short distance wireless communication between the first device 210, the external input device 220, and the second device 230 is based on NFC, the second device 230 may read information from an NFC chip or an NFC tag installed in the external input device 220.

The security level information included in the authentication information of FIG. 3 is invariable information. At a time when the information transmission request signal is received and/or the information transmission request signal is received, the first device 210 may set a security level according to a location thereof, previously store the authentication information, and determine whether to transmit target information to the external input device 220 as described above using the previously stored authentication information and information regarding the security level set according to the time and/or the location.

Figure 11:
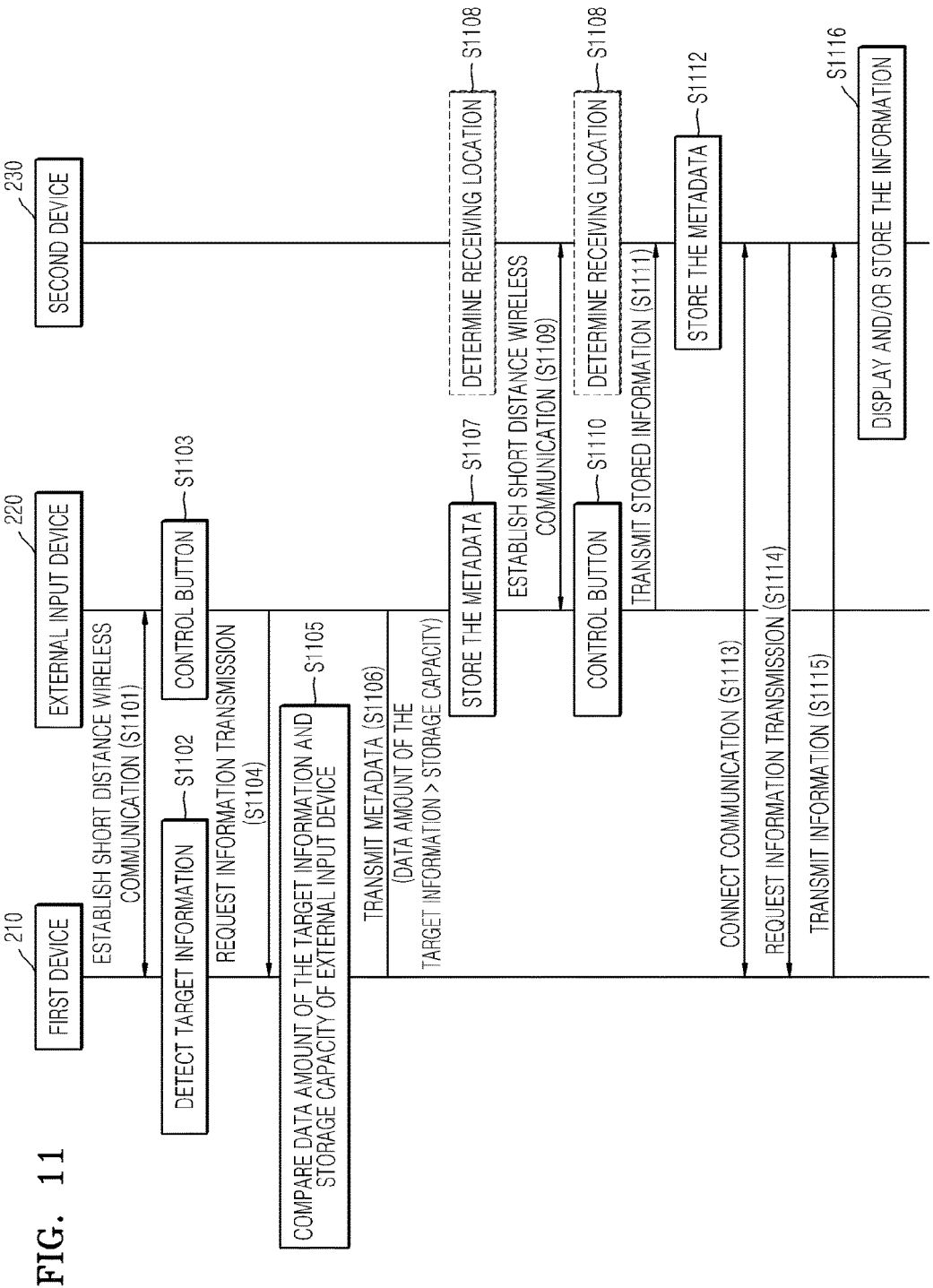
FIG. 11 is a flowchart of an information transmission method, according to an exemplary embodiment.

FIG. 11 is a flowchart of an information transmission method, according to an exemplary embodiment. In FIG. 11, a data amount of target information selected in the first device 210 is not smaller than a storage capacity of the external input device 220.

Operations S1101-S1104 and S1108-S1111 of FIG. 11 are the same as operations S301-S304 and S307-S310, and thus descriptions thereof are omitted here.

In operation S1105, the first device 210 compares the data amount of selected target information with the storage capacity of the external input device 220. The data amount of the selected target information is detected in operation S1102. The storage capacity of the external input device 220 may be provided from the external input device 220 when short distance wireless communication is established between the first device 210 and the external input device 220 in operation S1101 or when an information transmission request signal is received from the external input device 220.

If it is determined that the data amount of target information is not smaller than the storage capacity of the external input device 220 in operation S1105, the first device 210 transmits only metadata of the target information to the external input device 220 (operation S1106). Thus, the external input device 220 stores the received metadata (operation S1107). The second device 230 receives and stores the metadata from the external input device 220 (operation S1112). If it is determined that the data amount of target information is smaller than the storage capacity of the external input device 220 in operation S1105, the first device 210, the external input device 220, and the second device 230 operate based on the flowchart of FIG. 3.

If the second device 230 stores the metadata, the second device 230 connects communication with the first device 210 based on the metadata (operation S1113). To this end, the metadata may include information necessary for connecting communication with the first device 210. The information necessary for connecting communication with the first device 210 may include unique identification information of the first device 210, a communication service of the first device 210, etc. used to communicate with the first device 210.

The second device 210 transmits an information transmission request signal regarding the target information to the first device 210 based on the metadata (operation S1114). Thus, the first device 210 transmits the target information to the second device 230 (operation S1115). The second device 230 displays and/or stores the received target information on and/or in a display location designated in operation S1116. The display location designated in operation S1116 may be referred to as a receiving location.

The flowchart of FIG. 11 shows a case where the data amount of target information is greater than the storage capacity of the external input device 220. However, the flowchart of FIG. 11 may be changed to a flowchart of comparing the total data amount of the target information and the metadata of the target information with the storage capacity of the external input device 220.

That is, in operation S1105 of FIG. 11, the first device 210 compares the total data amount of the target information and the metadata of the target information with the storage capacity of the external input device 220. If it is determined that the total data amount of the target information and the metadata of the target information is not smaller than the storage capacity of the external input device 220, the first device 210 transmits the metadata of the target information to the external input device 220 as shown in FIG. 11. Thus, the external input device 220 and the second device 230 performs operations S1107-S1116 as described above.

If the total data amount of the target information and the metadata of the target information is not smaller than the storage capacity of the external input device 220, the first device 210 may compare the data amount of the metadata of the target information with the storage capacity of the external input device 220 before transmitting the metadata of the target information to the external input device 220. If it is determined that the data amount of the metadata of the target information is not smaller than the storage capacity of the external input device 220, the first device 210 may output a transmission unavailability message or a message requesting to secure the storage capacity of the external input device 220.

However, if it is determined that the total data amount of the target information and the metadata of the target information is smaller than the storage capacity of the external input device 220, the first device 210 may transmit the target information and the metadata of the target information to the external input device 220 as described with reference to FIG. 3 above.

Figure 12:
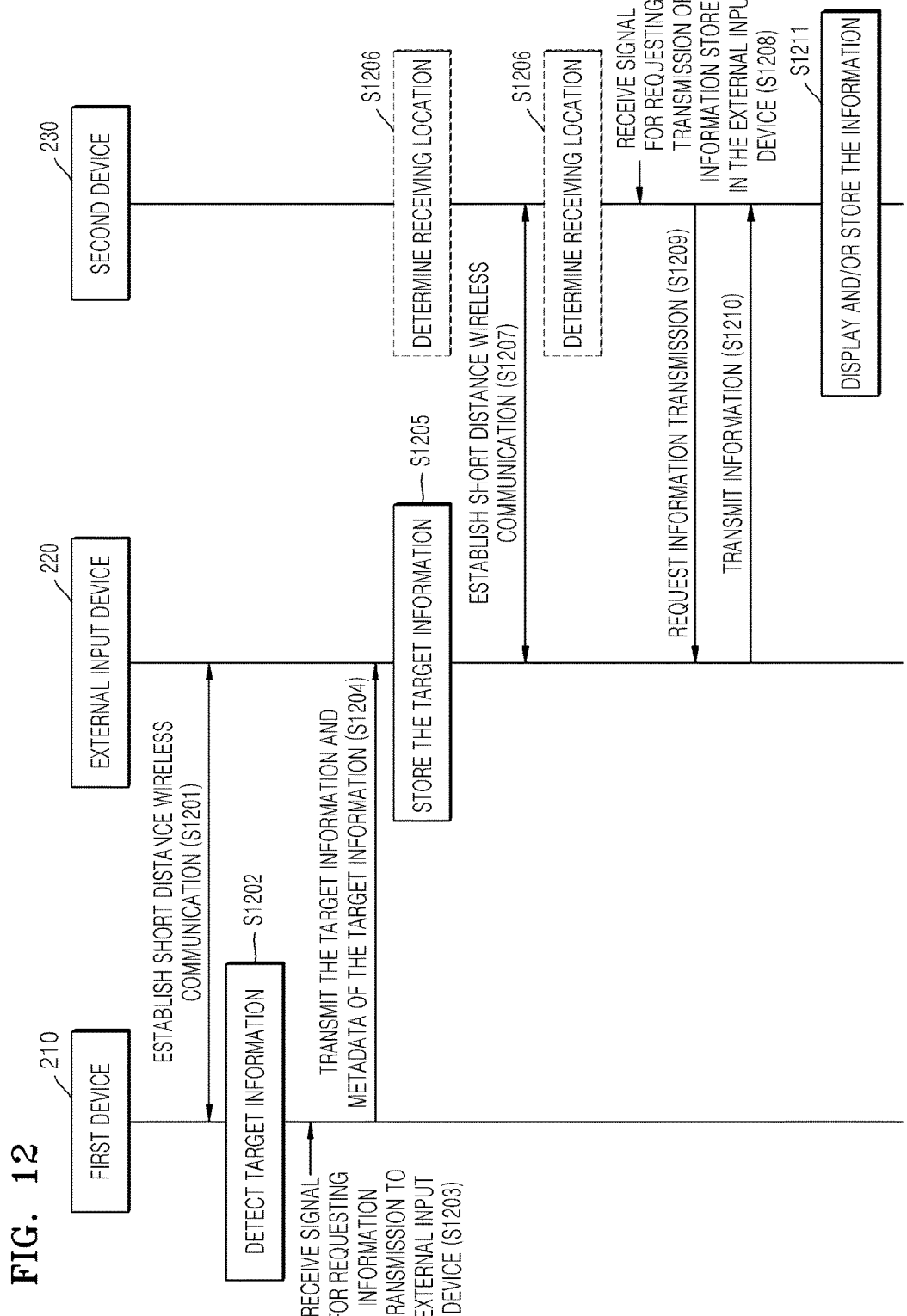
FIG. 12 is a flowchart of an information transmission method, according to an exemplary embodiment.

FIG. 12 is a flowchart of an information transmission method, according to an exemplary embodiment. FIG. 12 shows a case where the information transmission request button 701 and the storage information transmission request button 702 as shown in FIGS. 7 and 8 are not provided in the external input device 220, the first device 210 transmits target information or the target information and metadata of the target information to the external input device 220 according to user input information based on the first device 210, and the external input device 220 transmits the stored target information or the target information and metadata of the target information to the second device 230 according to user input information based on the second device 230.

Operations S1201-S1202 and S1204-S1207 of FIG. 12 are the same as operations S301-S302 and S305-S308, and thus descriptions thereof are omitted here.

If the first device 210 receives an information transmission request signal to the external input device 220 by using at least one of a hardware button of the first device 210, a touch based user gesture on the first device 210, and a sound recognition function of the first device 210 (operation S1203), the first device 210 transmits and stores target information or the target information and metadata of the target information to the external input device 220 (operation S1204 and S1205).

If the second device 230 receives the information transmission request signal stored in the external input device 220 by using at least one of a hardware button of the second device 230, a touch based user gesture on the second device 230, and a sound recognition function of the second device 230 (operation S1208) as described above, the second device 230 transmits the information transmission request signal to the external input device 220 (operation S1209). If the second device 230 receives the stored information from the external input device 220 (operation S1210), the second device 230 displays the received information in the display location (operation S1211) and/or stores the information in the second device 230.

FIG. 13 is a block diagram of an example of the first device 210 of FIG. 2. Referring to FIG. 13, the first device 210 includes an input information receiver 1301, storage 1302, a communication interface 1303, a short distance wireless communication interface 1304, an output unit 1305, and a processor 1306.

The input information receiver 1301 is configured to receive the above-described user input information. Thus, the input information receiver 1301 is configured to receive a touch based user gesture, user voice recognition, user face recognition, text and images expressed using a touch tool, and a signal generated by controlling a physical button. The input information receiving unit 1301 may include a touch screen, an audio signal input unit such as a microphone, a camera, and a physical button unit.

The storage 1302 is configured to store at least one program and/or a command set and resource that are configured to be executed in the processor 1306 that will be described later. The at least one program stored in the storage unit 1302 includes at least one program necessary for executing the information transmission method according to an exemplary embodiment, an operating system program of the first device 210, an application program related to diverse functions performed by the first device 210, and a program for driving hardware components included in the first device 210.

The resource stored in the storage 1302 may include information necessary for setting and determining target information and authentication information and security level information for authenticating the external input device 220 according to an exemplary embodiment. The security level information may be changed based on a time at which an information transmission request signal is received and a location of the first device 210. The storage 1302 may store the above-described authentication table. The resource stored in the storage 1302 may further include user information of the first device 210, information necessary for managing the application program set in the first device 210, and information necessary for executing the program for driving the above hardware components.

The storage 1302 may be configured to independently include storage storing at least one program for driving each element included in the first device 210 and the operating system program and storage storing one or more programs for executing the information transmission method according to an exemplary embodiment, a resource, and the application programs The storage unit 1302 may include high speed random access memory (RAM), a magnetic disk storage device, a non-volatile memory such as flash memory, or another non-volatile semiconductor memory. Thus, the storage unit 1302 may be referred to as memory.

The at least one program and/or the command set that are stored in the storage unit 1302 may be classified as a plurality of modules according to functions.

Figure 14:
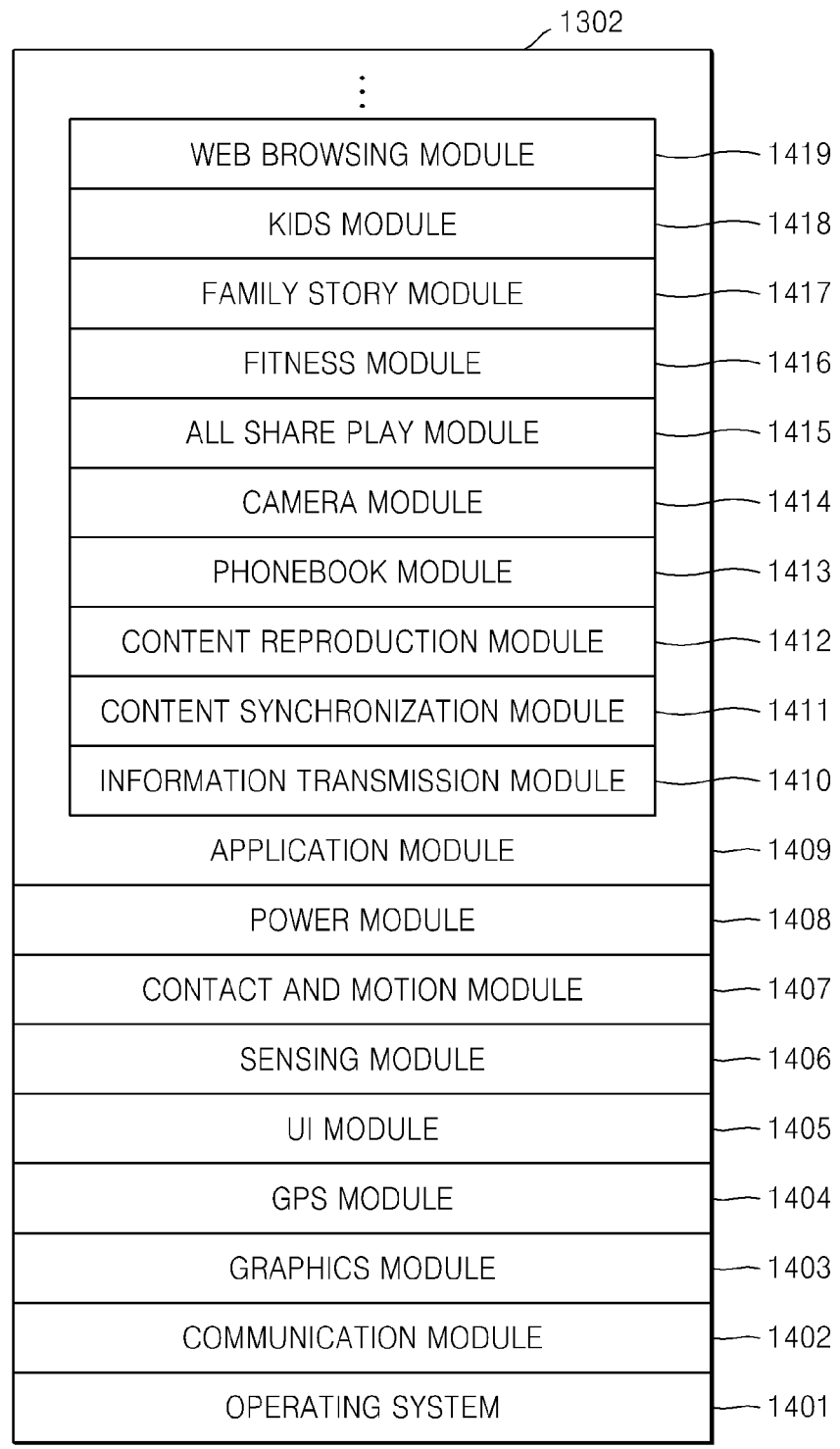
FIG. 14 shows an example of programs and/or command sets that are stored in storage of FIG. 13.

FIG. 14 shows an example of programs and/or command sets that are stored in the storage unit 1302 and classified according to modules. Referring to FIG. 14, the storage unit 1302 includes an operating system 1401, a communication module 1402, a graphics module 1403, a global positioning system (GPS) module 1404, a user interface (UI) module 1405, a sensing module 1406, a contact and motion module 1407, a power module 1408, and an application module 1409, but is not limited thereto.

The application module 1409 includes an information transmission module 1410, a content synchronization module 1411, a content reproduction module 1412, a phonebook module 1413, a camera module 1414, an all share play module 1415, a fitness module 1416, a family story module 1417, a kids module 1418, and a web browsing module 1419, but is not limited thereto.

The operating system 1401 controls and manages a general function of the first device 210 and includes a software component for enabling communication between hardware and software components included in the first device 210.

The communication module 1402 enables communication with the external input device 220, the second device 230, and a server 2410 that will be described later through the communication interface 1303. The communication module 1402 includes a software component for processing data received from and transmitted to the external input device 220, the second device 230, and the server 2410 through the communication interface 1303. The received and transmitted data may include an information transmission request signal, authentication information, target information, and metadata of the target information. The communication module 1402 according to an exemplary embodiment may download at least one application from the server 2410.

The graphics module 1403 includes a software component for brightness adjustment and rendering of graphics displayed on the output unit 1305 and a software component for providing a virtual keyboard (or a soft keyboard) for inputting text in the application module 1409.

The GPS module 1404 includes a software component for determining a location of the first device 210 and providing the determined location to an application that provides a location based service. The GPS module 1404 may provide the location of the first device 210 when the information transmission module 1401 is executed.

The UI module 1405 includes a software component for providing a UI necessary for an application that provides the input information receiving unit 1301 and the output unit 1305 base UI information.

The sensing module 1406 includes a software component for determining sensing information based on the input information receiving unit 1301 and providing determined sensing information based service to the application module 1409.

The contact and motion module 1407 includes a software component for detecting the input information receiver 1301 based touch contact, tracking a contact based motion, and providing the tracked motion to the application module 1409 requiring the tracked motion. The input information receiver 1301 based touch contact includes a touch contact by the external input device 220.

The power module 1408 includes a software component for controlling a power supply to hardware components included in the first device 210 by interfacing with the operating system 1401, and controlling a sleep mode with respect to power supplied to the output unit 1305.

Functions of the modules included in the application module 1409 may be intuitively inferred by one of ordinary skill in the art from their titles, and thus only the application module 1409 related to exemplary embodiment will now be described.

For example, if the information transmission method according to an exemplary embodiment is requested to be performed through the input information receiver 1301 of the first device 210, the processor 1306 may execute the information transmission module 1410. The information transmission module 1410 may be executed concurrently with execution of another application.

Accordingly, when a specific application is or is not being executed, if target information on the output unit 1305 of the first device 210 is selected, the information transmission module 1410 may detect selected target information as described with reference to FIG. 2 and may operate as described with reference to FIGS. 3, 11, and 12.

For example, after the information transmission module 1410 is executed, if the web browsing module 1419 is executed to select target information from an optional web page, the information transmission module 1410 detects the selected target information, and transmits the detected target information to the external input device 220 as described with reference to FIGS. 2 and 3.

The communication interface 1303 may transmit and receive data to and from the second device 230 and the server 2410 over the network 240 such as a wireless network including wireless Internet, wireless Intranet, a wireless phone network, a wireless local area network (LAN), a Wi-Fi network, a Wi-Fi direct (WFD) network, a 3G network, a 4G Long Term Evolution (LTE) network, a Bluetooth network, an infrared data association (IrDA) network, a radio frequency identification (RFID) network, a ultra wideband (UWB) network, and a Zigbee network or a wired network including wired Internet and a home phoneline networking alliance (PNA) network. The network 240 of FIG. 2 may be the wired network or the wireless network based on the communication interface 1303.

The communication interface 1303 may include at least one of a broadcasting reception module, a mobile communication module, a wired Internet module, a short distance communication module, and a location information module, but is not limited thereto.

The broadcasting reception module receives a broadcasting signal and/or a broadcasting related signal from an external broadcasting management server (not shown) through a broadcasting channel. The broadcasting channel may include a satellite channel, a terrestrial channel, and a cable channel. The mobile communication module transmits and receives a wireless signal to and from a base station (not shown), the server 2410, and the second device 230 over a mobile communication network. The wireless signal may include a sound call signal, a conference call signal, or data in various forms according to transmission and reception of text and multimedia messages.

The wireless Internet module is a module for wireless Internet access. The wired Internet module is a module for wired Internet access. The short distance communication module is a module for short distance communication. Short distance communication technologies may use Bluetooth, RFID, infrared communication, UWB, Zigbee, WFD, and NFC.

The location information module is a module for determining or obtaining a location of the first device 210. An example of the location information module is a GPS based location information module. The GPS based location information module receives location information from a plurality of artificial satellites. The location information may include coordinate information including latitude and longitude.

The short distance wireless communication interface 1304 performs short distance wireless communication based on a communication protocol such as a NFC network, a Bluetooth network, and an RFID network. Accordingly, the short distance wireless communication interface 1304 may set short distance wireless communication with the external input device 220 and the second device 230 and perform short distance wireless communication. If short distance wireless communication is NFC based, the short distance wireless communication interface 1304 may be configured as an NHC chip set, and a carrier field provided by the first device 210 may supply power to the external input device 220. In this case, the external input device 220 may receive power that is supplied from the carrier field provided by the first device 210 to transmit and receive data. However, the external input device 220 may be configured to have its own power supply. The external input device 220 will be described in detail with reference to FIGS. 19 and 20 later.

The output unit 1305 outputs user interface information according to input information and information according to execution of a content synchronization program. The output unit 1305 may include a display function and an audio signal output function. The output unit 1305 may be integrally configured with the input information receiving unit 1301. The output unit 1305 may include a liquid crystal display (LCD), a thin film transistor liquid crystal display (TFT-LCD), an organic light-emitting diode (OLED), a flexible display, a 3D display, or an active matrix OLED (AM OLED), but is not limited thereto. The number of output units 1305 may be two or more according to an implementation form of the first device 210.

The processor 1306 may be referred to as one or more processors that control a general operation of the first device 210. The reason for referring to the processor 1306 as one or more processors is that although the processor 1306 is implemented as a single chip in FIG. 13, the processor 1306 may be divided into a plurality of processors according to a function of the first device 210.

The processor 1306 may generally control the input information receiver 1301, the storage 1302, the communication interface 1303, the short distance wireless communication interface 1304, and the output unit 1305 through the operating system 1401 and the modules 1402-1419 that are stored in the storage unit 1302. Thus, the processor 1306 may be referred to as a controller, a microprocessor, a digital signal processor, etc. The processor 1306 may provide a user interface by using the operating system 1401, the UI module 1405, the input information receiving unit 1301, and the output unit 1305.

The processor 1306 may execute at least one program related to the information transmission method according to an exemplary embodiment and perform one of the methods performed by the first device 210 as shown in the flowcharts of FIGS. 3, 11, and 12 or one of methods as shown in flowcharts of FIGS. 16-18 which will be described later. The processor 1306 may execute the program by reading the program from the storage unit 1302 or downloading the program from a server (not shown) or cloud servers (not shown) connected through the communication unit 1303.

The processor 1306 may execute at least one program related to the information transmission method according to an exemplary embodiment stored in cloud servers (not shown) to set an environment in which the first device 210 may perform the information transmission method.

The processor 1306 may be understood to include an interface function unit interfacing between various hardware components included in the first device 210 and the processor 1306.

Figure 15:
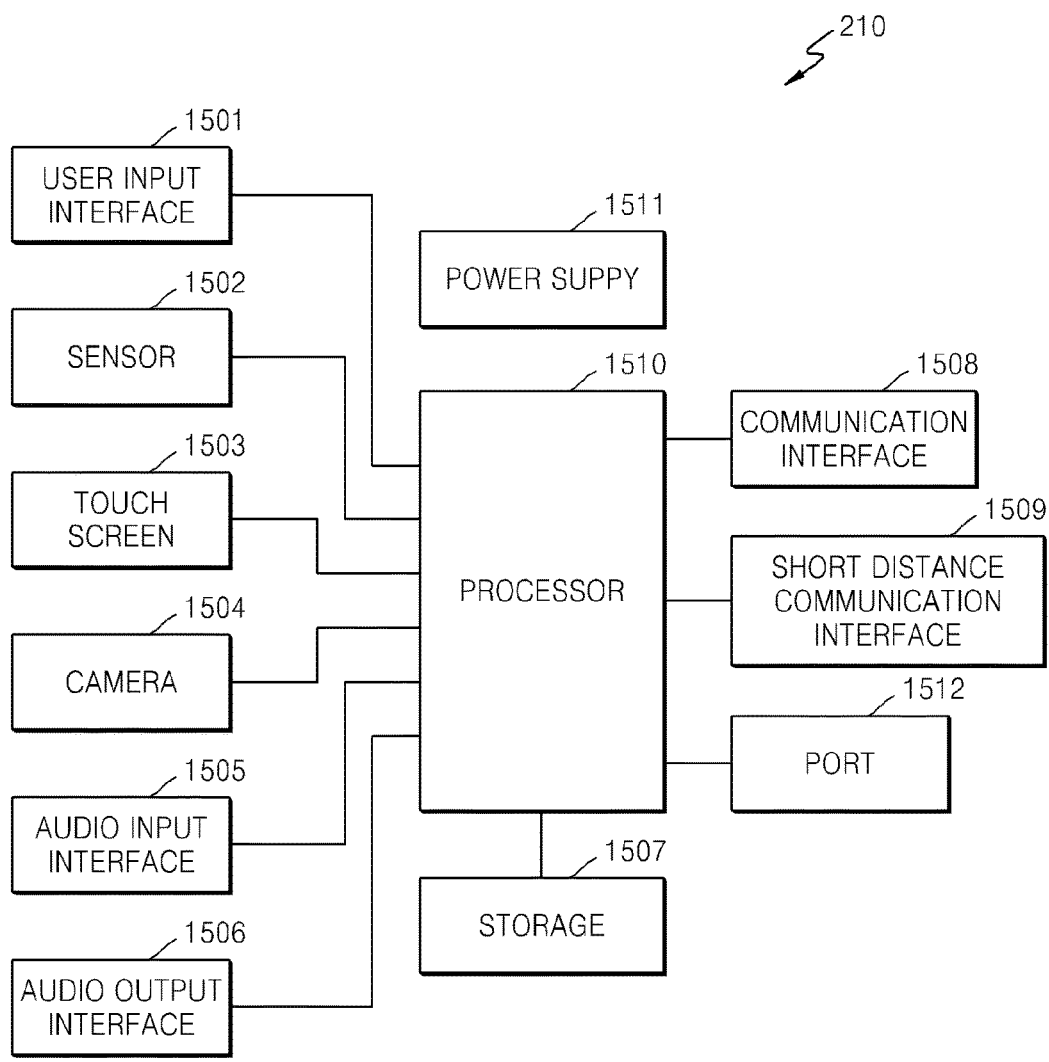
FIG. 15 is a block diagram of another example of a first device of FIG. 2.

FIG. 15 is a block diagram of another example of the first device 210 of FIG. 2. Referring to FIG. 15, the first device 210 includes a user input interface 1501, a sensor 1502, a touch screen 1503, a camera 1504, an audio input interface 1505, an audio output interface 1506, storage 1507, a communication interface 1508, a short distance communication interface 1509, a processor 1510, a power supply 1511, and a port 1512. However, a construction of the first device 210 is not limited to that shown in FIG. 15.

The user input interface 1501 is configured to generate input data (or control data) for controlling an operation of the first device 210 and the above-described user input information. The user input interface 1501 may include a key pad, a dome switch, a touch pad replacing a mouse, a jog wheel, a jog switch, a hardware button, etc., but is not limited thereto.

The sensor 1502 is configured to sense a current status of the first device 210 such as a location of the first device 210, whether there is any user contact, an orientation of the first device 210, an acceleration or deceleration of the first device 210, etc. and generates a sensing signal for controlling the operation of the first device 210. The sensor 1502 may include a proximity sensor and the above-described motion sensor. Thus, the sensor 1502 may generate a signal that recognizes a sensor based user gesture.

The proximity sensor is a sensor for detecting whether an object approaches a previously set detection surface or whether the object is present nearby by using a force of an electromagnetic field or an infrared ray without any actual physical touch. Examples of the proximity sensor include a transparent photoelectric sensor, a direct reflective photoelectric sensor, a mirror reflective photoelectric sensor, a high frequency oscillation photoelectric sensor, a capacitive photoelectric sensor, a magnetic photoelectric sensor, an infrared photoelectric sensor, etc.

A touch screen 1503 based user input information may be generated according to a user request or a user selection that depends on the above-described user gesture. The user gesture may be various combinations of a touch frequency, a touch pattern, a touch area, and a touch intensity. A user's finger based touch on the touch screen 1503 may be understood based on a body part of a user that may touch a touch region of the touch screen 1503.

The touch screen 1503 may include various sensors for sensing a touch or proximity touch of the touch screen 1503. Sensors included in the touch sensor 1503 are sensors that sense user gestures or patterns on the touch screen 1503. Thus, the touch screen 1503 may generate signals that sense the above-described touch based drag, flick, tap, touch and hold, double tap, panning, sweep, and proximity sensor based user gestures or patterns. A proximity sensor for the touch screen 1503 may be the same as the proximity sensor included in the sensing unit 1502.

An example of the sensor for sensing the touch of the touch screen 1503 may include a tactile sensor. The tactile sensor may sense various types of information such as roughness of a touch surface, hardness of a touch object, a temperature at a touch point, etc. The touch of the touch screen 1503 means a pointer touching a touch panel. The touch may include a multi-touch. A proximity touch of the touch screen 1503 occurs when the pointer does not actually touch the touch panel but approaches the touch panel to within a predetermined distance. Examples of the pointer may include a stylus pen, a user's finger, a human body part corresponding to the finger, or a tool corresponding to the finger, etc. Thus, the pointer may be referred to as an external input device.

The touch screen 1503 displays information processed by the first device 210. For example, the touch screen 1503 displays user gestures or touch patterns sensed through the sensing unit included in the touch screen 1503, control data or user input information input through the user input interface 1501 or a screen responding to a signal sensed through the sensor 1502.

The touch screen 1503 may be referred to as an input and output device. When the touch screen 1503 is the input and output device, a screen displayed on the touch screen 1503 includes a user interface (UI) or a graphical UI (GUI). The touch screen 1503 may display the screens as shown in FIGS. 4A, 4B, 5, and 6, and may receive the user input information.

The touch screen 1503 may include an LCD, a TFT-LCD, an OLED, a flexible display, a 3D display, or an AMOLED, but is not limited thereto. The number of the touch screen 1503 may be two or more according to an implementation form of the first device 210.

The camera 1504 processes an image frame such as a still image or a moving image obtained by an image sensor (or a photo sensor) in a conference call mode or a photographing mode. The processed image frame may be displayed on the touch screen 1503. The image frame processed by the camera 1504 may be stored in the storage unit 1507 or transmitted to an external device through the communication interface 1508 or the port 1512 or the short distance wireless communication unit 1512.

The number of cameras 1504 may be two or more according to the construction of the first device 210. The camera 1504 may be used as an input device for recognizing a user space gesture. The image frame obtained by the camera 1504 may be a face image for authenticating a user of the first device 210.

The audio input interface 1505 may receive an input of an external acoustic signal in a call mode, a recording mode, or a voice recognition mode, convert the acoustic signal to electrical voice data, and transmit the electrical voice data to the processor 1510. The audio input interface 1505 may be configured as, for example, a microphone. The audio input interface 1505 may be configured to include diverse noise removal algorithms for removing noise generated during a process for receiving the input of the external acoustic signal.

The acoustic signal input by using the audio input interface 1505 may be natural language user input information. For example, an information transmission request command may be input through the audio input unit 1505. The user input information based on users voice recognition may be received via the audio input interface 1505. The external acoustic signal input through the audio input interface 1505 may be stored in the storage 1507 or transmitted to the outside through the communication interface 1508 or the port 1512 or the short distance wireless communication interface 1512.

The user input interface 1501, the sensor 1502, the touch screen 1503, the camera 1504, and the audio input interface 1505 may be referred to as an information input interface or an information input and output interface according to an interfacing function between the first device 210 and the user. For example, if the interfacing function between the first device 210 and the user includes a touch recognition function, a voice recognition function, and a space gesture recognition function, the user input interface 1501, the sensor 1502, the camera 1504, and the audio input interface 1505 may be referred to as the information input interface, and the touch screen 1503 may be referred to as the information input and output interface.

The audio output interface 1506 outputs the acoustic signal or an audio signal that is received from the outside in the call mode or an audio reproduction mode. The audio output interface 1506 may be configured as a speaker. If the audio signal is generated when an application is executed, the audio output interface 1506 outputs the audio signal. The audio input interface 1505 and the audio output interface 1506 may be integrally formed within a head set.

Figure 24:
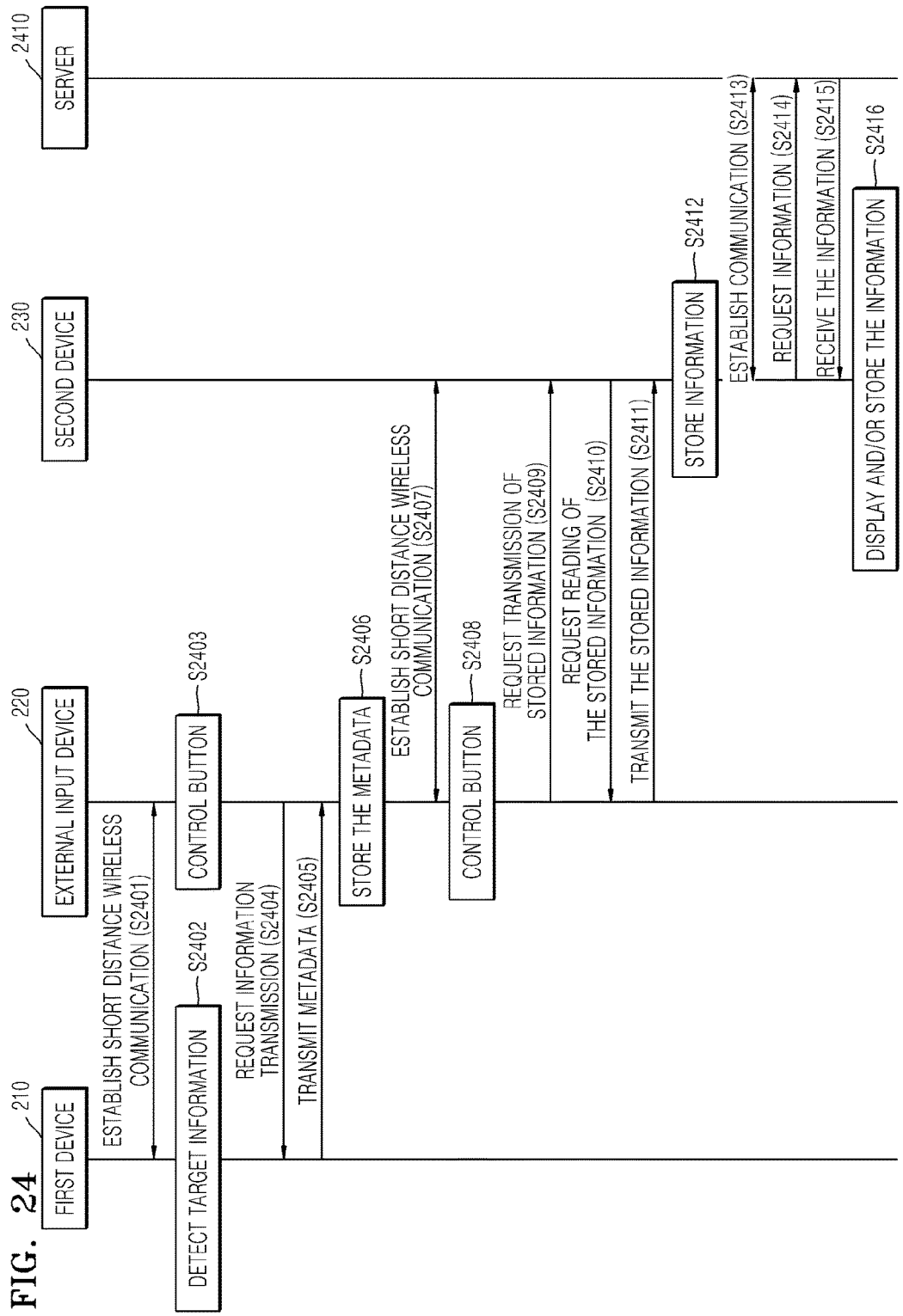
FIG. 24 is a flowchart of an information transmission method, according to an exemplary embodiment.

The communication interface 1508 may transmit and receive data to and from the second device 230 and the server 2410 of FIG. 24 over a wireless network including wireless Internet, wireless Intranet, a wireless phone network, a LAN, a Wi-Fi network, a WFD network, a 3G network, a 4G LTE network, a Bluetooth network, an IrDA network, a RFID network, a UWB network, and a Zigbee network or a wired network including wired Internet and a home PNA network. The network 240 of FIG. 2 may be the wired network or the wireless network based on the communication unit 1303.

The communication interface 1508 may include at least one of the broadcasting reception module, the mobile communication module, the wired Internet module, the short distance communication module, and the location information module that are mentioned with reference to the communication interface 1303, but is not limited thereto.

The port 1512 may transmit and receive data to and from the outside by using a plug and play interface such as a universal serial bus (USB) port (not shown). The plug and play interface is a module that automatically plays when the second device 230 or an external device (not shown) is plugged into the first device 210.

The power supply 1511 supplies power to a hardware component included in the first device 210. The power supply 1511 includes one or more power sources such as a battery and an alternating current (AC) power source. The first device 210 may not include the power supply 1511 but may include a connection unit (not shown) that may be connected to an external power supply (not shown).

The processor 1510 may be referred to as one or more processors that control a general operation of the first device 210. The reason for referring to the processor 1510 as one or more processors is that although the processor 1510 is implemented as a single chip in FIG. 15, the processor 1510 may be divided into a plurality of processors according to a function of the first device 210.

The processor 1510 may generally control the user input interface 1501, the sensor 1502, the touch screen 1503, the camera 1504, the audio input interface 1505, the audio output interface 1506, the storage 1507, the communication interface 1508, the short distance communication interface 1509, the power supply 1511, and the port 1512 by using an operating system and various modules included in the storage 1507.

The above-described operating system and various modules may correspond to the operating system and various modules of FIG. 14. The processor 1510 may be referred to as a controller, a microprocessor, and a digital signal processor. The processor 1510 may also provide a user interface through the user input interface 1501, the sensor 1502, the touch screen 1503, the camera 1504, and the audio input interface 1506 by using the operating system 1401 and the UI module 1405 stored in the storage 1507.

The processor 1511 may execute at least one program related to the information transmission method according to an exemplary embodiment and perform one of the methods performed by the first device 210 as shown in flowcharts of FIGS. 3, 11, and 12 or one of methods as shown in flowcharts of FIGS. 16-18 which will be described later. The processor 1511 may execute a program for performing the information transmission method by reading the program from the storage 1507 or downloading the program from at least one of the server 2410 or cloud servers (not shown) and the second device 230 connected through the communication interface 1508. The second device 230 may be referred to as an external device of the first device 210.

Figure 16:
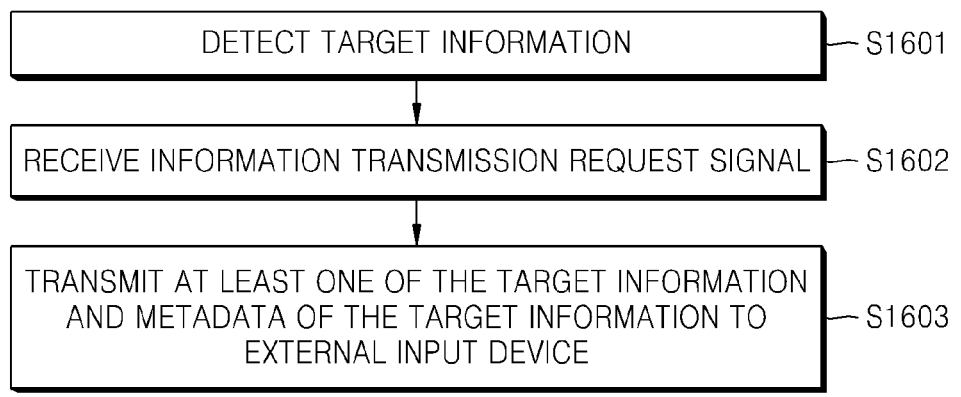
FIG. 16 is a flowchart of an information transmission method performed by a first device, according to an exemplary embodiment.

FIG. 16 is a flowchart of an information transmission method performed by the first device 210, according to an exemplary embodiment. The information transmission method of FIG. 16 may be performed by the processors 1306 and 1501 using at least one program and resource stored in the storages 1302 and 1511. However, for convenience of description, in the present embodiment, the information transmission method is performed by the processor 1306.

As described with reference to FIG. 3, the processor 1306 of the first device 210 detects target information for transmission to the external input device 220 when an optional application is executed or a menu screen or a home screen is displayed (operation S1601). The detection of the target information includes selection of the target information, detection of the selected target information and detection of a data amount of the selected target information as described with reference to FIG. 2.

After the target information is detected, if an information transmission request signal is received based on at least one user input information of user input information based on the external input device 220 and user input information based on the first device 210 (operation S1602), the processor 1306 transmits at least one of the target information and metadata of the target information to the external input device 220 (operation S1603) as described with reference to FIGS. 2 and 3.

Figure 17:
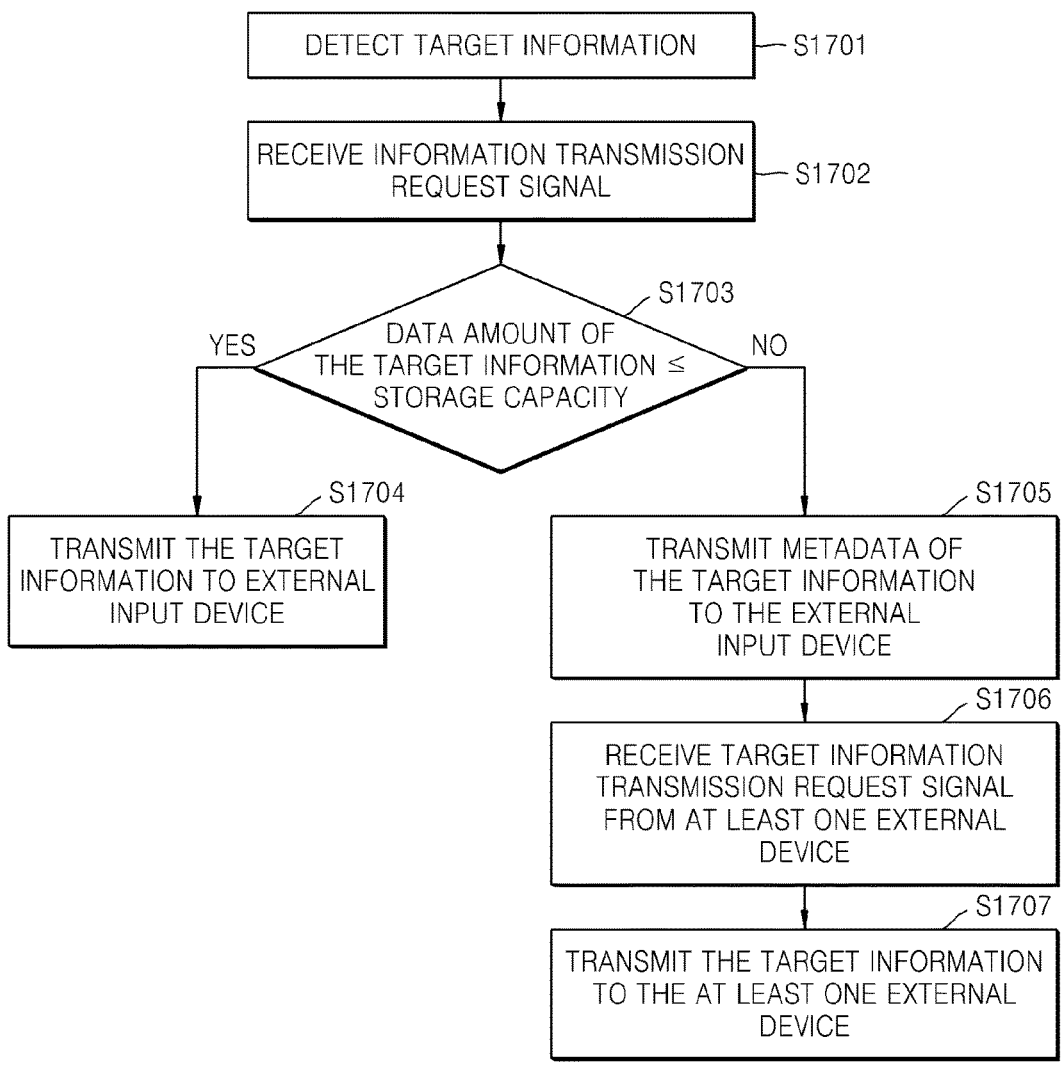
FIG. 17 is a flowchart of an information transmission method performed by a first device, according to an exemplary embodiment.

FIG. 17 is a flowchart of an information transmission method performed by the first device 210, according to an exemplary embodiment. The information transmission method of FIG. 17 includes an operation of comparing a storage capacity of the external input device 220 with a data amount of target information shown in FIG. 11.

Referring to FIG. 17, the processor 1306 detects target information (operation S1701) which is similar to operation S1601 of FIG. 16. If an information transmission request signal transmitted to the external input device 220 is received (operation S1702), the processor 1306 compares a data amount of the target information that is to be transmitted with the storage capacity of the external input device 220 (operation S1703). In this regard, the storage capacity of the external input device 220 is a total available storage capacity.

If the data amount of the target information is less than or equal to the storage capacity of the external input device 220 (operation S1703), the processor 1306 transmits the target information to the external input device 220 (operation S1704). If the data amount of the target information greater than the storage capacity of the external input device 220 (operation S1703), the processor 1306 transmits metadata of the target information to the external input device 220 (operation S1705). Thereafter, if a target information transmission request signal is received from the second device 230 that is at least one external device (operation S1706), the processor 1306 transmits the target information to the second device 230 that is at least one external device (operation S1707).

Like the flowchart of FIG. 11, the flowchart of FIG. 17 may be changed to a flowchart of comparing the total data amount of the target information and the metadata of the target information with the storage capacity of the external input device 220, and transmitting the target information and the metadata of the target information or only the metadata of the target information to the external input device according to a result of the comparison.

Figure 18:
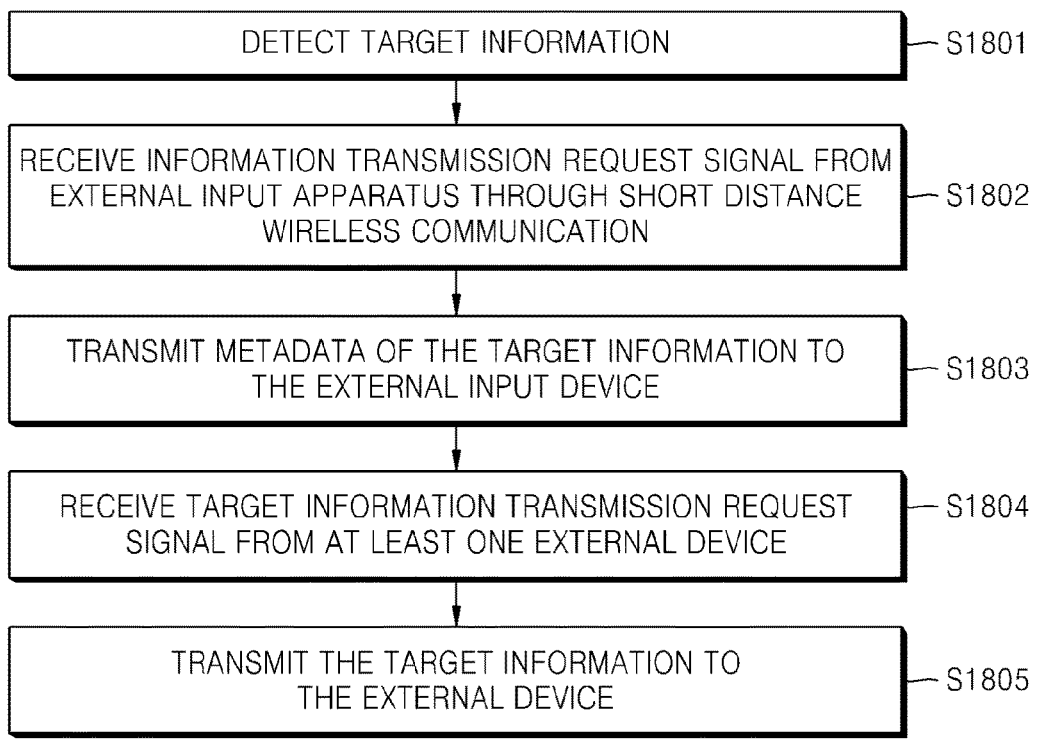
FIG. 18 is a flowchart of an information transmission method performed by a first device, according to an exemplary embodiment.

FIG. 18 is a flowchart of an information transmission method performed by a first device, according to an exemplary embodiment. In FIG. 18, only metadata of target information is transmitted to the external input device 220, and, if a target information transmission request signal is received from the second device 230 that is at least one external device, the target information is transmitted from the first device 210 to the second device 230.

In operation S1801, the processor 1306 detects the target information. The target information may be detected as described with reference to FIGS. 2 and 3.

If an information transmission request signal is received from the external input device 220 through short distance wireless communication (operation S1802), the processor 1306 transmits the metadata of the target information to the external input device 220 (operation S1803). Thereafter, the processor 1306 performs operations S1804 and S1805 corresponding to operations S1706 and S1707 of FIG. 17. Thus, the target information is transmitted to the second device 230.

Figure 19:
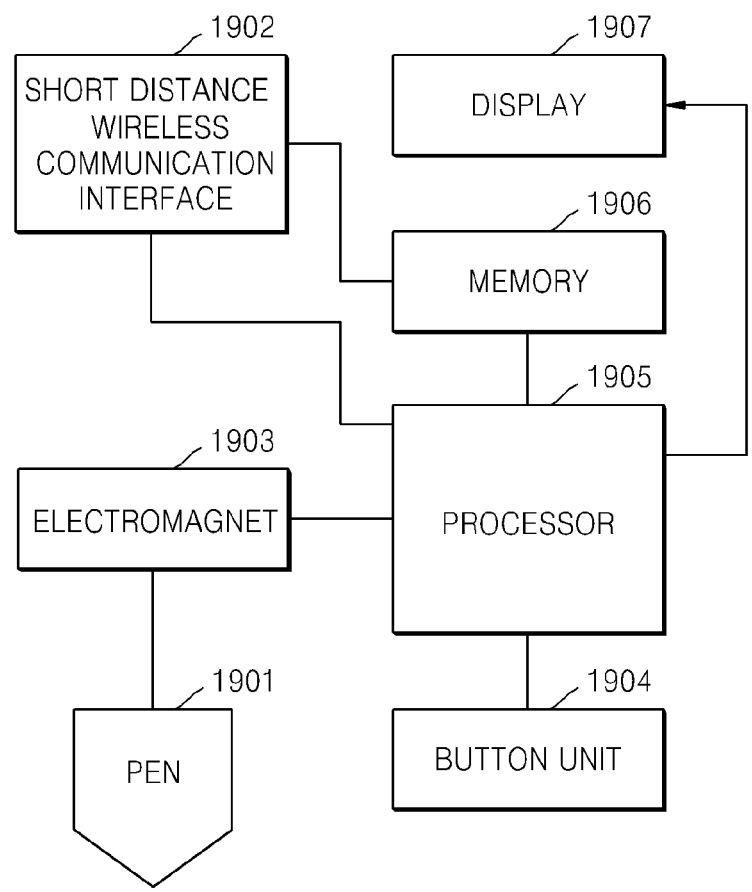
FIG. 19 is a block diagram of an example of an external input device of FIG. 2.

FIG. 19 is a block diagram of an example of the external input device 220 of FIG. 2. The external input device 220 of FIG. 19 does not have its own power supply.

Referring to FIG. 19, the external input device 220 includes a pen 1901, an electromagnet 1903, a button unit 1904, a processor 1905, a memory 1906, a display 1907, and a short distance wireless communication interface 1902. However, the external input device 220 is not limited thereto.

The pen 1901 may include a tip that has a small thickness so that a touch based input information may be precisely input to the first device 210 and the second device 230.

The electromagnet 1903 sends a current to the pen 1901 if the pen unit 1903 contacts the electromagnet 1903. Thus, if the pen 1901 touches the touch screen 1503 of the first device 210 or the second device 230, the pen 1902 contacts the electromagnet 1903 and sends the current to the touch screen 1503 so that a detection sensor of the touch screen 1503 detects a pen pressure of the pen 1901, a speed thereof, and coordinate information thereof on the touch screen 1503. A member for separating the electromagnet 1903 and the pen 1901 from each other may be further provided therebetween. The member for separating the electromagnet 1903 and the pen 1901 from each other may use a rubber ring.

The button unit 1904 includes the information transmission request button 701 and the storage information transmission request button 702 mentioned in FIGS. 7 and 8. If one of the information transmission request button 701 and the storage information transmission request button 702 included in the button unit 1904 is controlled, the processor 1905 temporarily stops a current flow through the electromagnet 1903. To this end, the electromagnet 1903 includes a member (not shown) controlled by the processor 1905 and temporarily stops the current flow. The member for stopping the current flow may be the same as the member for separating the electromagnet 1903 and the pen 1901 from each other. If both members are the same, the button unit 1904 may not be connected to the processor 1905 but may be directly connected to the above-described member so that the above-described member may separate the electromagnet 1903 and the pen 1901 from each other when one of the information transmission request button 701 and the storage information transmission request button 702 included in the button unit 1904 is controlled.

Accordingly, the touch screen 1503 of the first device 210 or the second device 230 transmits a result of the detection that no current temporarily flows to a processor of each device while touching the pen 1901. Thus, the processor of the first device 210 may recognize generation of an information transmission request signal from the external input device 220, and the processor of the second device 230 may recognize generation of a signal according to a storage information transmission request or transmission of stored information to the external input device 220. In this regard, whether the above-described detection is related to an information transmission request or a storage information transmission request may be determined, for example, according to a time during which no current temporarily flows. To this end, the processor 1905 may control the above-described member included in the electromagnet 1903 so as to control the time during which no current temporarily flows via the pen 1901 according to the controlled button of the information transmission request button 701 and the storage information transmission request button 702 included in the button unit 1904.

The processor 1905 may transmit the information transmission request signal according to the control of the button included in the above-described button unit 1904 to the first device 210 through the short distance wireless communication unit 1902, and transmit information stored in the memory 1906 to the second device 230 according to the storage information transmission request as the button included in the button unit 1904 is controlled. When the above-described stored information is transmitted to the second device 230 according to a read request of the second device 230, the processor 1905 may transmit a signal indicating the storage information transmission request is made to the second device 230 through the short distance wireless communication interface 1902 as the button included in the button unit 1904 is controlled, and may receive a read request signal from the second device 230 through the short distance wireless communication interface 1902. The above-described operation may be performed according to an operation condition set in the processor 1905.

The memory 1906 stores at least one piece of target information received from the first device 210 through the short distance wireless communication interface 1902 and metadata of the target information, and transmits the information stored in the memory 1906 to the second device 230 through the short distance wireless communication unit 1902.

The memory 1906 may store authentication information of the external input device 220, and transmit the authentication information to a corresponding device when short distance wireless communication is established between the first device 210 or the second device 230 and the external input device 220 or a request signal according to the control of the button included in the button unit 1904 may be transmitted to the first device 210 or the second device 230 via the short distance wireless communication unit 1901. The authentication information may include security level information.

The display unit 1907 may display information regarding a result of monitoring a storage space of the memory 1906 by the processor 1905 like the display unit 703 of FIG. 7. The display unit 1907 may be configured as a display device like LED.

The external input device 220 of FIG. 19 receives power from a device in which short distance wireless communication is established through the short distance wireless communication unit 1902 and supplies power to elements requiring the power.

Figure 20:
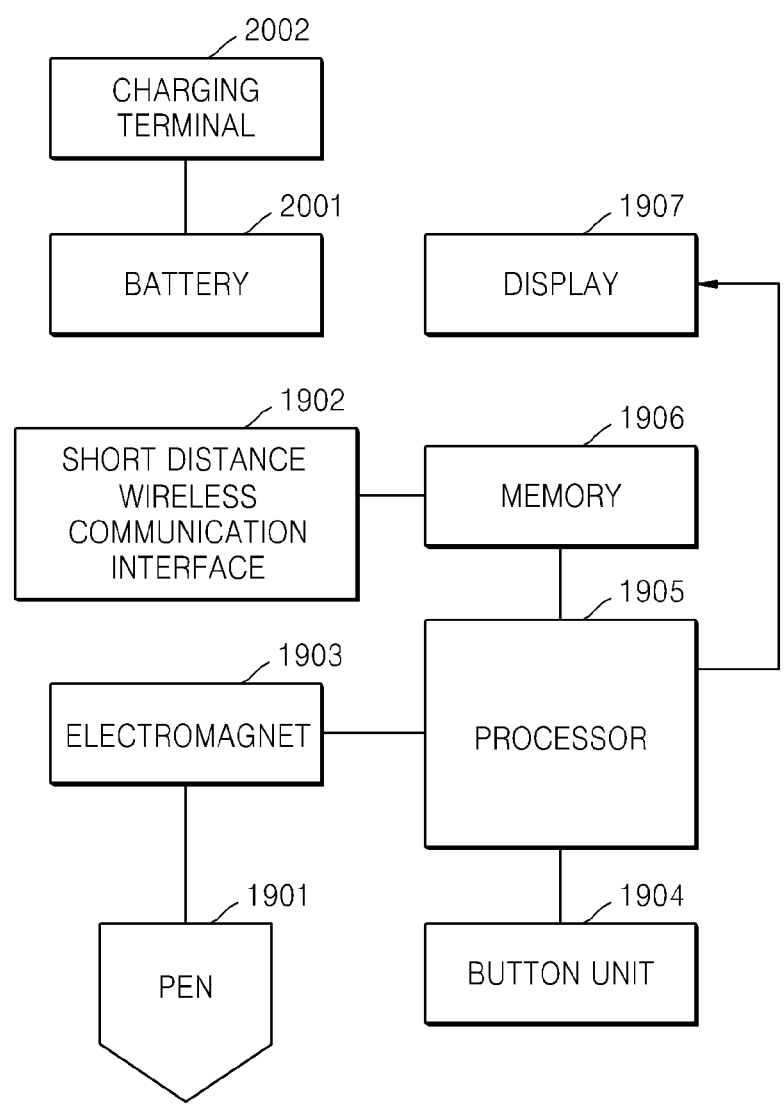
FIG. 20 is a block diagram of another example of the external input device of FIG. 2.

FIG. 20 is a block diagram of another example of the external input device 220 of FIG. 2. The external input device 220 of FIG. 20 has a function of supplying its own power. Thus, the external input device 220 of FIG. 20 is configured to add a battery 2001 and a charging terminal 2002 to elements included in the external input device 220 of FIG. 19.

The battery 2001 is charged through the charging terminal 2002 and supplies power to the processor 1905, the memory 1906, and the display 1907 requiring power among the elements included in the external input device 220. However, when short distance wireless communication is established between the external input device 220 and the first device 210 or the second device 230, the battery 2001 may be used after being charged through the short distance wireless communication interface 1902.

Figure 21:
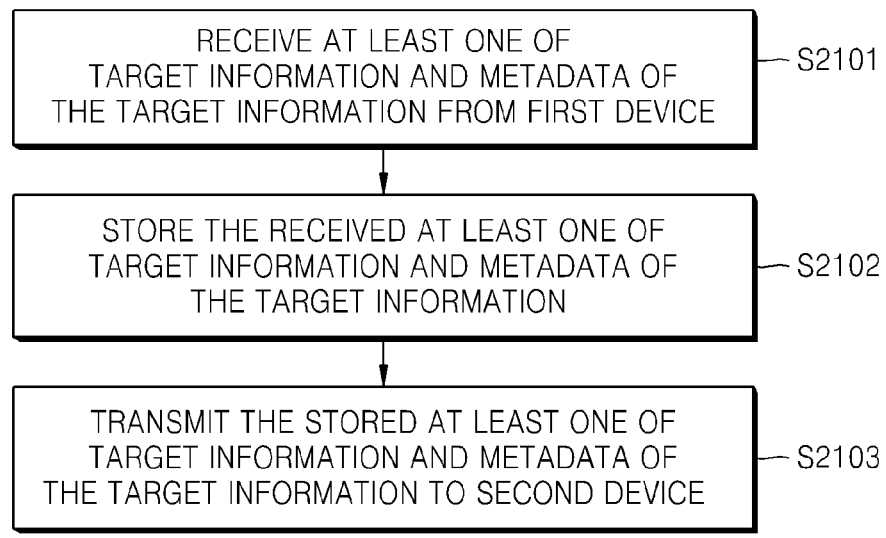
FIG. 21 is a flowchart of an information transmission method performed by an external input device, according to an exemplary embodiment.

FIG. 21 is a flowchart of an information transmission method performed by the external input device 220, according to an exemplary embodiment. The information transmission method of FIG. 21 may correspond to the information transmission method performed by the external input device 220 of FIG. 3. The information transmission method of FIG. 21 may be performed by the processor 1905 of FIGS. 19 and 20. To this end, the memory 1906 may store at least one program and resource for performing the information transmission method according to an exemplary embodiment.

Referring to FIG. 21, if an information transmission request is made through the button unit 1904, the processor 1905 receives at least one of target information and metadata of the target information from the first device 210 through the short distance wireless communication unit 1902 (operation S2101). In this regard, the processor 1905 may transmit authentication information of the external input device 220 to the first device 210 through the short distance wireless communication interface 1902 to allow the first device 210 to perform authentication as described above.

The processor 1905 stores the received at least one of target information and metadata of the target information in the memory 1906 (operation S2102). The processor 1905 may monitor a storage space of the memory 1906 and display status information of the storage space of the memory 1906 on the display unit 1907 according to a result of the monitoring as described with reference to FIG. 7 while storing the information in the memory 1906. The status information of the storage space of the memory 1906 may be expressed as at least one of images and text that change according to a change in the storage space of the memory 1906. If the at least one of target information and metadata of the target information is completely stored in the memory 1906, the processor 1905 may display information indicating whether the information is completely stored on the display unit 1907.

If an information transmission request for the stored information is made through the button unit 1904, the processor 1905 transmits the stored at least one of target information and metadata of the target information to the second device through the short distance wireless communication interface 1902 (operation S2103). When the stored at least one of target information and metadata of the target information is transmitted to the second device 230, the external input device 220 may monitor the storage space of the memory 1906, and display status information of the storage space of the memory 1906 on the display 1907 according to a result of the monitoring as described with reference to FIG. 7.

When the stored information is transmitted to the second device 230, the processor 1905 may transmit the authentication information of the external input device 220 to the second device 230 to allow the second device 230 to perform authentication as described above. The processor 1905 may display information indicating whether the information is completely transmitted on the display 1907 according to whether the stored information is completely transmitted to the second device 230. When the processor 1905 transmits the stored information to the second device 230, if a plurality of pieces of target information is to be transmitted, the processor 1905 continuously transmits the plurality of pieces of target information to the second device 230 in the order of the plurality of pieces of target information that are stored through the short distance wireless communication interface 1902. The processor 1905 may transmit the plurality of pieces of target information to the second device 230 one by one in the order of the plurality of pieces of target information that are stored or in a reverse order of storage through the short distance wireless communication interface 1902 each time a storage information transmission request button included in the button unit 1904 is controlled. The processor 1905 may also transmit all the plurality of pieces of target information to the second device 230 simultaneously a storage information transmission request button included in the button unit 1904 is controlled.

Figure 22:
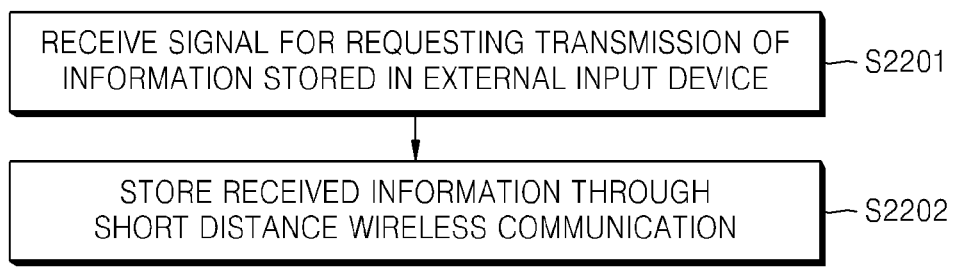
FIG. 22 is a flowchart of an information transmission method performed by a second device, according to an exemplary embodiment.

FIG. 22 is a flowchart of an information transmission method performed by the second device 230, according to an exemplary embodiment.

The second device 230 may be configured similarly to the first device 210. Thus, the detailed description of the first device 210 provided with reference to FIGS. 13 to 15 may be applied to the second device 230. However, each function element shown in FIGS. 13 to 15 may operate differently according to the first device 210 or the second device 230.

Figure 25:
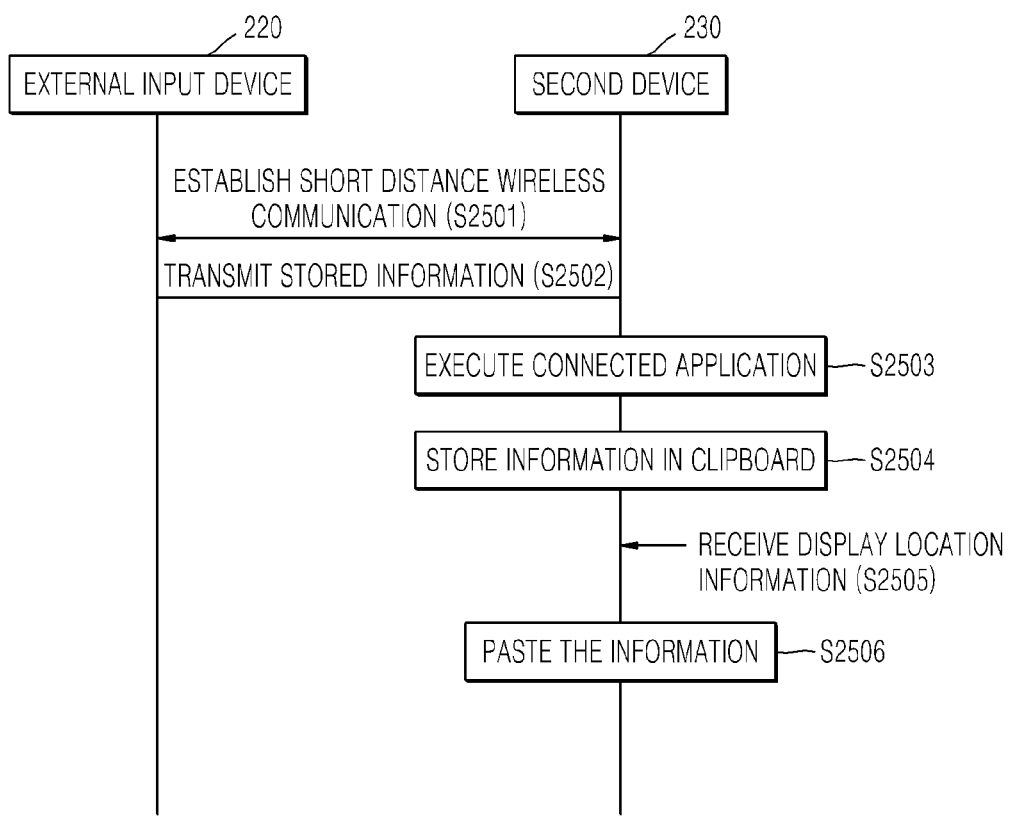
FIG. 25 is a flowchart of an information transmission method, according to an exemplary embodiment.
Figure 26:
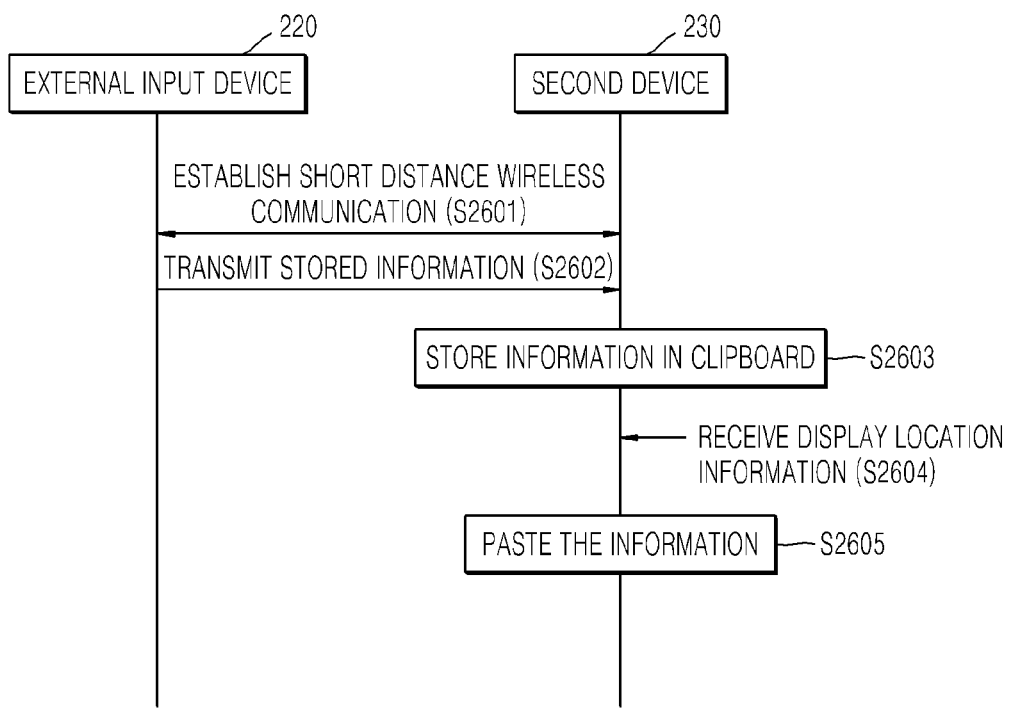
FIG. 26 is a flowchart of an information transmission method, according to an exemplary embodiment.

For example, if the block diagram of FIG. 13 is related to the first device 210 as described above, the processor 1306 operates as shown in the flowcharts of FIGS. 16 to 18. However, if the block diagram of FIG. 13 is related to the second device 230, the processor 1306 may operate as shown in the flowcharts of FIGS. 22, 25, and 26.

That is, if a stored information transmission request signal regarding information stored in the external input device 220 is received (operation S2201), the processor 1306 stores the information received from the external input device 220 through short distance wireless communication (operation S2202).

Although it is not described whether the received information is target information or metadata of the target information in FIG. 22, in operation S2302, the target information may be processed by determining whether the received information is target information or metadata of the target information. That is, different operations may be performed according to the received information as described in the flowcharts of FIGS. 3 and 11 regarding the second device 230.

Figure 23:
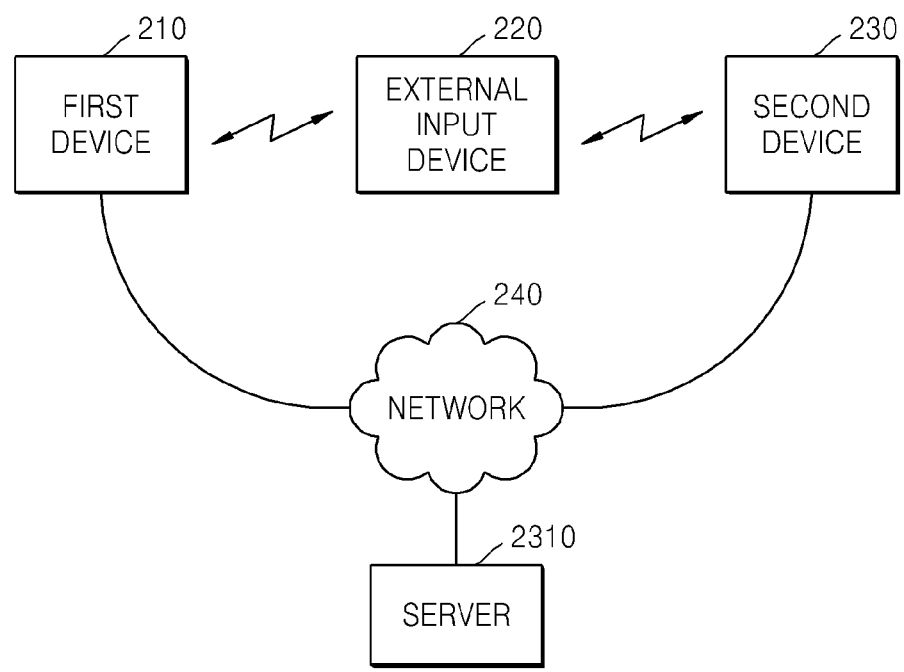
FIG. 23 illustrates a configuration of an information transmission system, according to an exemplary embodiment.

FIG. 23 illustrates a configuration of an information transmission system, according to an exemplary embodiment. The information transmission system of FIG. 23 further includes the server 2310 compared to the information transmission system of FIG. 2. The configuration illustrated in FIG. 23 may be referred to as a configuration of a network used to perform the information transmission method according to an exemplary embodiment.

The server 2310 may include a cloud server or an information providing server. If a target information transmission is requested from the second device 230, the server 2310 transmits requested target information to the second device 230. To request the target information transmission, the second device 230 needs to have account information of the server 230. The server 2310 may provide an application according to a request of the first device 210 and the second device 230.

FIG. 24 is a flowchart of an information transmission method based on the information transmission system of FIG. 23, according to an exemplary embodiment. Operations S2401-S2408 of FIG. 24 are the same as operations S1101-S1104, S1106, S1107, S1109, S1110, of FIG. 11, respectively.

In operation S2409, the external input device 220 sends a request for transmission of stored information to the second device 230. In operation S2410, the request reading of the stored information is sent from the second device 230 to the external input device 220. If metadata is stored in the second device 230, the second device 230 establishes communication with the server 2310 based on the stored metadata over the network 240 (operation S2412).

If communication is established between the second device 230 and the server 2310 (operation S2413), the second device 230 requests target information transmission from the server 2310 based on the metadata (operation S2414). Thus, if target information is received from the server 2310 (operation S2415), the second device 230 displays and/or stores the received target information (operation S2416). In this regard, the second device 230 may designate a receiving location to display the received target information on a previously designated receiving location (or display location) before requesting the target information transmission from the server 2310 as described with reference to FIG. 3.

FIG. 25 is a flowchart of an information transmission method performed between the external input device 220 and the second device 230, according to an exemplary embodiment. Operations S306-S311 described with reference to FIG. 3 may replace the flowchart of FIG. 25.

Referring to FIG. 25, when short distance wireless communication is set between the external input device 220 and the second device 230 in operation S2501, information stored in the external input device 220 is transmitted to the second device 230 (operation S2502). In this regard, the external input device 220 may transmit the above-described authentication information to the second device 230, authenticate the external input device 220 as described with reference to FIG. 3, and allow the second device 230 to process the information received from the external input device 220. In FIG. 25, the external input device 220 may not include or need to control the storage information transmission button 702 to transmit the stored information to the second device 230 as described in the above-described embodiments.

If the second device 230 receives the information from the external input device 220, the second device 230 automatically executes an application related to target information based on the received information and/or based on information stored in the second device 230 (operation S2503). The application may be automatically executed based on metadata of the target information. The metadata of the target information may include information regarding the application related to the target information and a command to execute the application. Thus, the information received in operation S2502 includes the metadata of the target information or the target information and the metadata of the target information. Whether the metadata of the target information or the target information and the metadata of the target information is received from the external input device 220 may be determined according to a storage capacity of the external input device 220 or a data amount of the target information or the target information and the metadata of the target information as described in the above-described embodiments.

After the application is executed, the second device 230 automatically stores the received information in a clipboard (operation S2504). The received information may be automatically stored in the clipboard based on information included in the metadata of the target information. However, even if a command for storing the received information in the clipboard is not included in the metadata of the target information, the received information may be automatically stored in the clipboard according to an operation condition set in the second device 230.

If the target information and the metadata of the target information are stored in the clipboard, and user input information regarding display location information is received (operation S2505), the second device 230 pastes the target information stored in the clipboard to a display location designated according to the user input information (operation S2506).

If a plurality of display locations to which the target information is to be pasted are designated on the second device 230, and one piece of target information is stored in the clipboard, the second device 230 pastes the target information to the plurality of display locations. The target information stored in the clipboard may be understood as information received from the external input device 220.

If a plurality of display locations to which the target information is to be pasted are designated on the second device 230, and the plurality of pieces of target information are stored in the clipboard based on the information received from the external input device 220, the second device 230 pastes the target information to the display locations according to the order of the target information that is received based on the received information.

However, when the information received in operation S2502 includes only the metadata of the target information, since the information stored in the clipboard includes only the metadata of the target information, the second device 230 may establish communication with the first device 210 as described with reference to FIG. 11 based on the information stored in the clipboard to receive the target information or may establish communication with the server 2310 as described with reference to FIG. 24 to receive the target information, and then may paste the target information to the display location designated according to the user input information. The order of receiving (downloading) the target information from one of the first device 210 and the server 2310 and designating the display location based on the above-described user input information may be switched.

FIG. 26 is a flowchart of an information transmission method, according to an exemplary embodiment. In FIG. 26, target information is received from the external input device 220. Thus, target information stored in the external input device 220 is transmitted to the second device 230 when short distance wireless communication is established between the external input device 220 and the second device 230 (operations S2601 and S2602).

Figure 27:
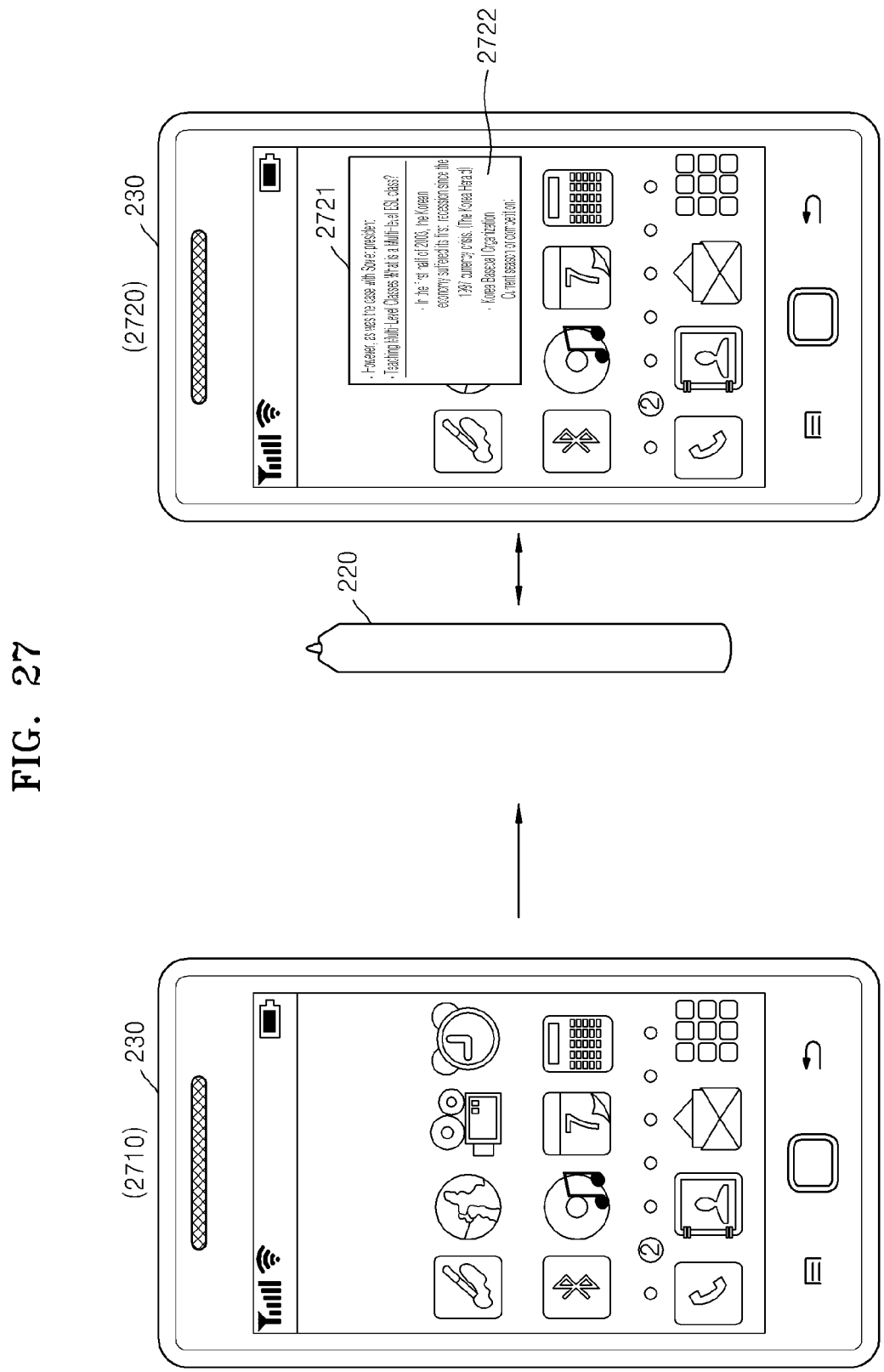
FIG. 27 shows screen examples of a second device in the flowchart of FIG. 26.

Thus, the second device 230 automatically stores a clipboard and stores the received target information in the clipboard (operation S2603). That is, when the second device 230 displays a screen 2710 of FIG. 27, when short distance wireless communication is set based on a distance between the external input device 220 and the second device 230, if the target information (for example, 100 of FIG. 1) is transmitted from the external input device 220 to the second device 230, the second device 230 displays a screen 2720 of FIG. 27 including a clipboard 2721 including received target information 2722.

If display location information is received according to input information of a user of the second device 230 (operation S2604), the second device 230 pastes the target information stored in the clipboard to a received display location (operation S2605). In operation S2605, the second device 230 may execute an application related to the target information based on the user input information and paste the target information in the application, screen, document, etc.

The above-described operations of the second device 230 of FIGS. 25 and 26 may be performed by the processors 1306 and 1510 as shown in the flowchart of FIG. 22. The operations of the external input device 220 may be performed by the processor 1905.

The information transmission method according to an exemplary embodiment may also be embodied as computer readable codes on a computer readable recording medium. The computer readable medium may be any recording device capable of storing data that is read by a computer system, e.g., a read-only memory (ROM), a random access memory (RAM), a compact disc (CD)-ROM, a magnetic tape, a floppy disk, an optical data storage device, and so on. The computer readable medium may be distributed among computer systems that are interconnected through a network, and the exemplary embodiments may be stored and implemented as computer readable code in a distributed manner.

While exemplary embodiments have been particularly shown and described with reference, it will be understood by those of ordinary skill in the art that various changes in form and details may be made therein without departing from the spirit and scope of the inventive concept as defined by the following claims.

What is claimed is:

1. An information transmission method performed by a first device, the method comprising:
receiving a selection of a stylus about first target information displayed on the first device;
extracting the first target information corresponding to the selection performed by the stylus; and
transmitting, via a first communication interface, the first target information or metadata corresponding to the first target information to the stylus, wherein the transmitting comprises:
detecting a size of the first target information;
receiving an information transmission request signal corresponding to the first target information including information on an available storage capacity of the stylus;
if the size of the first target information is less than or equal to the available storage capacity of the stylus, transmitting, via the first communication interface, the first target information to the stylus, and
if the size of the first target information is greater than the available storage capacity of the stylus, transmitting, via the first communication interface, the metadata corresponding to the first target information to the stylus, wherein the metadata includes information for a second device to request and receive the first target information from the first device,
receiving, from the second device, a request for the first target information based on the metadata, and
transmitting, via a second wireless communication interface, the first target information to the second device.

2. The information transmission method of claim 1, wherein the selection comprises a selection of at least one display area according to a user input.

3. The information transmission method of claim 2, further comprising displaying information corresponding to the at least one display area.

4. The information transmission method of claim 3, wherein the information corresponding to the at least one display area comprises at least one of highlight information, boundary line information, looped curve information, and drag based block information.

5. The information transmission method of claim 1, wherein the selection comprises a selection of a plurality of display items or display locations displayed on the first device.

6. The information transmission method of claim 1, wherein the transmitting of the information corresponding to the first target information comprises changing of the display status of the first target information on the first device, based on an information transmission speed between the first device and the stylus.

7. The information transmission method of claim 1, further comprising:
receiving authentication information of the stylus,
wherein the transmitting of the information corresponding to the first target information further comprises determining whether to transmit the information corresponding to the first target information based on the authentication information of the stylus.

8. The information transmission method of claim 7, wherein the authentication information of the stylus is received from the stylus along with the information transmission request signal or is received from the stylus when communication is established between the first device and the stylus.

9. The information transmission method of claim 1, wherein the first communication interface is based on short distance wireless communication.

10. The information transmission method of claim 1, further comprising receiving information corresponding to second target information selected on the second device from the stylus; and
displaying, on the first device, the second target information based on the received information.

11. A first device comprising:
a first communication interface configured to transmit data to and receive data from a stylus; and
a processor configured to receive a selection of the stylus of first target information displayed on the first device, extract the first target information corresponding to the selection, and control the first communication interface to transmit the first target information or metadata corresponding to the first target information to the stylus,
wherein the controlling of the first communication interface to transmit the first target information or the metadata to the stylus comprises:
detecting a size of the target information;
receiving an information transmission request signal corresponding to the first target information including information on an available storage capacity of the stylus;
if the size of the target information is less than or equal to an available storage capacity of the stylus, transmitting, via the first communication interface, the first target information to the stylus, and
if the size of the target information is greater than the available storage capacity of the stylus, transmitting, via the first communication interface, the metadata corresponding to the first target information to the stylus, wherein the metadata includes information for a second device to request and receive the target information from the first device,
wherein the first device further comprises a second communication interface configured to transmit data to the second device and to receive data from the second device, and wherein the processor is further configured to control the second communication interface to receive, from the second device, a request for the target information based on the metadata, and transmit, via the second communication interface, the target information to the second device.

12. The first device of claim 11, wherein the first communication interface comprises a short distance wireless communication interface.

13. The first device of claim 11, further comprising:
a display,
wherein the processor is further configured to control the first communication interface to receive information corresponding to second target information selected on a second device from the stylus, and control the display to display the second target information based on the received information.

14. An information transmission method performed by a stylus, the information transmission method comprising:
transmitting, to a first device via a first communication interface, an information transmission request signal corresponding to first target information selected from a screen displayed on the first device including available storage capacity of the stylus;
receiving, from the first device via the first communication interface, first target information selected from a screen displayed on the first device or metadata corresponding to the first target information;
storing the received first target information or the received metadata in the stylus; and
transmitting the stored information to at least one of the first device and a second device,
wherein the receiving of the first target information or the metadata comprises:
receiving, via the first communication interface, the first target information when the size of the target information is less than or equal to the available storage capacity of the stylus, and
receiving, via the first communication interface, the metadata corresponding to the first target information when the size of the target information is greater than the available storage capacity of the stylus, wherein the metadata includes information for the second device to request and receive the first target information from the first device.

15. The information transmission method of claim 14, wherein the first communication interface is based on a short distance wireless communication interface.

16. The information transmission method of claim 14, further comprising displaying status information of a storage space of the stylus on the stylus.

17. The information transmission method of claim 14, further comprising transmitting authentication information of the stylus to the first device,
wherein the receiving is performed in response to the stylus being authenticated by the first device based on the authentication information of the stylus.

18. The information transmission method of claim 14, further comprising displaying information, on the stylus, indicating whether the transmitting the stored information is completed.

19. A stylus comprising:
a memory;
a tip configured to provide an input to a first device;
a first communication interface configured to transmit to and receive data from the first device and a second device;
a processor configured to:
control the first communication interface to transmit, to the first device, an information transmission request signal corresponding to first target information selected from a screen displayed on the first device including available storage capacity of the stylus, control the first communication interface to receive first target information or metadata corresponding to the first target information, control the memory to store the received first target information or the received metadata in the memory, and control the first communication interface to transmit the stored information to at least one of the first device and the second device, wherein the controlling of the first communication interface to receive the first target information or the received metadata comprises:

receiving the first target information when the size of the target information is less than or equal to the available storage capacity of the stylus, and receiving metadata corresponding to the first target information when the size of the first target information is greater than the available storage capacity of the stylus, wherein the metadata includes information for the second device to request and receive the target information from the first device.

20. The stylus of claim 19, wherein the first communication interface is based on a short range wireless communication interface.

21. The stylus of claim 19, further comprising:

a display, wherein the processor is further configured to monitor a storage space of the memory and control the display to display status information indicating the storage space, and wherein the processor is further configured to control the display to display information indicating whether the received first target information or the received metadata is completely stored in the memory and display information indicating whether the received first target information or the received metadata is completely transmitted to the second device.

22. The stylus of claim 19, wherein the memory further stores authentication information of the stylus, and wherein the processor is further configured to transmit the authentication information of the stylus to the first device when communication is established between the first device and the stylus, and transmit the authentication information to the second device when communication is established between the second device and the stylus.

* * * * *